US011532021B2

(12) United States Patent
 Soeda

(10) Patent No.: US 11,532,021 B2
(45) Date of Patent: *Dec. 20, 2022

(54) TRANSACTION MANAGEMENT SYSTEM, TRANSACTION MANAGEMENT METHOD, AND PROGRAM

(71) Applicant: PANASONIC INTELLECTUAL PROPERTY CORPORATION OF AMERICA, Torrance, CA (US)

(72) Inventor: Junichiro Soeda, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/062,317

(22) Filed: Oct. 2, 2020

(65) Prior Publication Data

US 2021/0019795 A1    Jan. 21, 2021

Related U.S. Application Data

(63) Continuation of application No. 16/163,676, filed on Oct. 18, 2018, now Pat. No. 10,832,296.

(Continued)

(30) Foreign Application Priority Data

Jun. 12, 2018    (JP) .............................. JP2018-112171

(51) Int. Cl.
 *G06Q 30/00* (2012.01)
 *G06Q 30/06* (2012.01)
 (Continued)

(52) U.S. Cl.
 CPC ......... *G06Q 30/06* (2013.01); *G06Q 10/0836* (2013.01); *G06Q 10/0837* (2013.01);
 (Continued)

(58) Field of Classification Search
 CPC ....................................................... G06Q 30/00
 See application file for complete search history.

(56) References Cited

U.S. PATENT DOCUMENTS 7,653,603 B1    1/2010 Holtkamp, Jr.
9,811,798 B2   11/2017 Lievens
 (Continued)

FOREIGN PATENT DOCUMENTS

EP         2887329       6/2015
JP      2002-099964      4/2002
 (Continued)

OTHER PUBLICATIONS

Roman, Nick, "Lelantos: Blockchain-based Anonymous Physical Delivery Stcyem", medium.com, dated Oct. 25, 2017. (Year: 2017).*
 (Continued)

*Primary Examiner* — Mark A Fadok
(74) *Attorney, Agent, or Firm* — Greenblum & Bernstein, P.L.C.

(57) ABSTRACT

A system for managing a transaction of an item between first and second users includes a first lock attached to the item, a storage unit having a second lock attached thereto and physically storing the item, and a processor that manages a first privilege to open the first lock and a second privilege to open the second lock. The processor performs management so that a holder of the first and second privileges is the first user. Upon receiving, from the storage unit, information indicating the second lock being opened, the processor performs management so that a first transaction is concluded in which the first user tentatively receives the item from the second user. Upon receiving, from the first lock, information indicating the first lock being opened, the processor per-
(Continued)

forms management so that a second transaction is concluded in which the first user inspects the item and finally receives the item.

14 Claims, 14 Drawing Sheets

Related U.S. Application Data

(60) Provisional application No. 62/587,055, filed on Nov. 16, 2017.

(51) Int. Cl.
| | | |
|---|---|---|
| *G07C 9/00* | (2020.01) | |
| *G06Q 20/28* | (2012.01) | |
| *H04W 4/80* | (2018.01) | |
| *G06Q 10/08* | (2012.01) | |

(52) U.S. Cl.
CPC ......... *G06Q 10/0838* (2013.01); *G06Q 20/28* (2013.01); *G06Q 30/0623* (2013.01); *G07C 9/00182* (2013.01); *G07C 9/00571* (2013.01); *G07C 9/00896* (2013.01); *H04W 4/80* (2018.02); *G07C 2009/0092* (2013.01); *G07C 2209/62* (2013.01)

(56) References Cited

U.S. PATENT DOCUMENTS

| | | |
|---|---|---|
| 9,898,711 B2 | 2/2018 | Neal |
| 10,002,341 B2 | 6/2018 | Schenken |
| 10,217,079 B2 | 2/2019 | Robinson |
| 10,501,205 B1 | 12/2019 | Siewert |
| 2004/0113792 A1 | 6/2004 | Ireland et al. |
| 2011/0068906 A1 | 3/2011 | Shafer et al. |
| 2011/0072132 A1 | 3/2011 | Shafer et al. |
| 2012/0024889 A1 | 2/2012 | Robertson |
| 2012/0130916 A1 | 5/2012 | Neal et al. |
| 2014/0019241 A1 | 1/2014 | Treiser et al. |
| 2014/0043163 A1 | 2/2014 | Yang |
| 2015/0106295 A1 | 4/2015 | Robinson |
| 2015/0120601 A1 | 4/2015 | Fee |
| 2015/0334524 A1 | 11/2015 | Fetzer et al. |
| 2016/0140820 A1 | 5/2016 | Joseph |
| 2016/0216106 A1 | 7/2016 | Motoyama |
| 2016/0239794 A9 | 8/2016 | Shafer et al. |
| 2017/0004691 A1 | 1/2017 | Alicot et al. |
| 2017/0017955 A1 | 1/2017 | Stern |
| 2017/0147975 A1 | 5/2017 | Natarajan et al. |
| 2017/0286905 A1 | 10/2017 | Richardson et al. |
| 2018/0096175 A1* | 4/2018 | Schmeling .............. B29C 64/10 |
| 2018/0108024 A1 | 4/2018 | Greco et al. |
| 2019/0012637 A1 | 1/2019 | Gillen |

FOREIGN PATENT DOCUMENTS

| | | |
|---|---|---|
| JP | 2003-242376 | 8/2003 |
| WO | 2017/080578 | 5/2017 |
| WO | 2017/167399 A1 | 10/2017 |

OTHER PUBLICATIONS

AlTawy, Riham et al., Lelantos: A Blockchain-Based Anonymous Physical Delivery System, 2012 15th Annual Conference, Aug. 2017. (Year: 2017).*

Summons to attend oral proceedings pursuant to Rule 115(1) EPC dated Apr. 16, 2021 for European Patent Application No. 18204035.2.

Anonymous: "Markenartikel Etikettieren /Verblomben und Rucknahme Verweigem wenn Etikett abgeht Oder Siegelbruc", Internet Article, Aug. 10, 2015 (Aug. 10, 2015), XP055790541, Retrieved from the Internet: URL: https://www.123recht.de/forum/internetrecht-edv-recht-femabsatz/Markenartikel-Etikettieren-Verblomben-und-Ruecknahme-Verweigem-wenn-Etikett-abgeht-oder-Siegelbruc-_f490814.html [retrieved on Mar. 26, 2021].

Stamps.com, (The lowdown on parcel lockers, blog.stamps.com, dated Feb. 23, 2017. (Year: 2017).

The Extended European Search Report dated Jan. 24, 2019 for the related European Patent Application No. 18204035.2.

Communication pursuant to Article 94(3) EPC dated Jul. 9, 2020 for European Patent Application No. 18204035.2.

* cited by examiner

FIG. 11

| | SITUATION 1 | SITUATION 2 | SITUATION 3 | SITUATION 4 |
|---|---|---|---|---|
| TRANSACTION USER | SECOND PERSON | SECOND PERSON/ COURIER | FIRST PERSON | FIRST PERSON |
| FIRST LOCK OPENING PRIVILEGE | FIRST PERSON | FIRST PERSON | FIRST PERSON | FIRST PERSON |
| SECOND LOCK OPENING PRIVILEGE | SECOND PERSON/ COURIER | FIRST PERSON | FIRST PERSON | FIRST PERSON |
| FIRST LOCK OPENING HISTORY | YES | YES | YES | NO |
| SECOND LOCK OPENING HISTORY | YES | YES | NO | YES |
| ITEM IDENTIFICATION INFORMATION | IDENTIFIER OF FIRST LOCK | IDENTIFIER OF FIRST LOCK | IDENTIFIER OF FIRST LOCK | IDENTIFIER OF FIRST LOCK |
| ITEM INFORMATION | ELECTRONIC GEAR A | ELECTRONIC GEAR A | ELECTRONIC GEAR A | ELECTRONIC GEAR A |

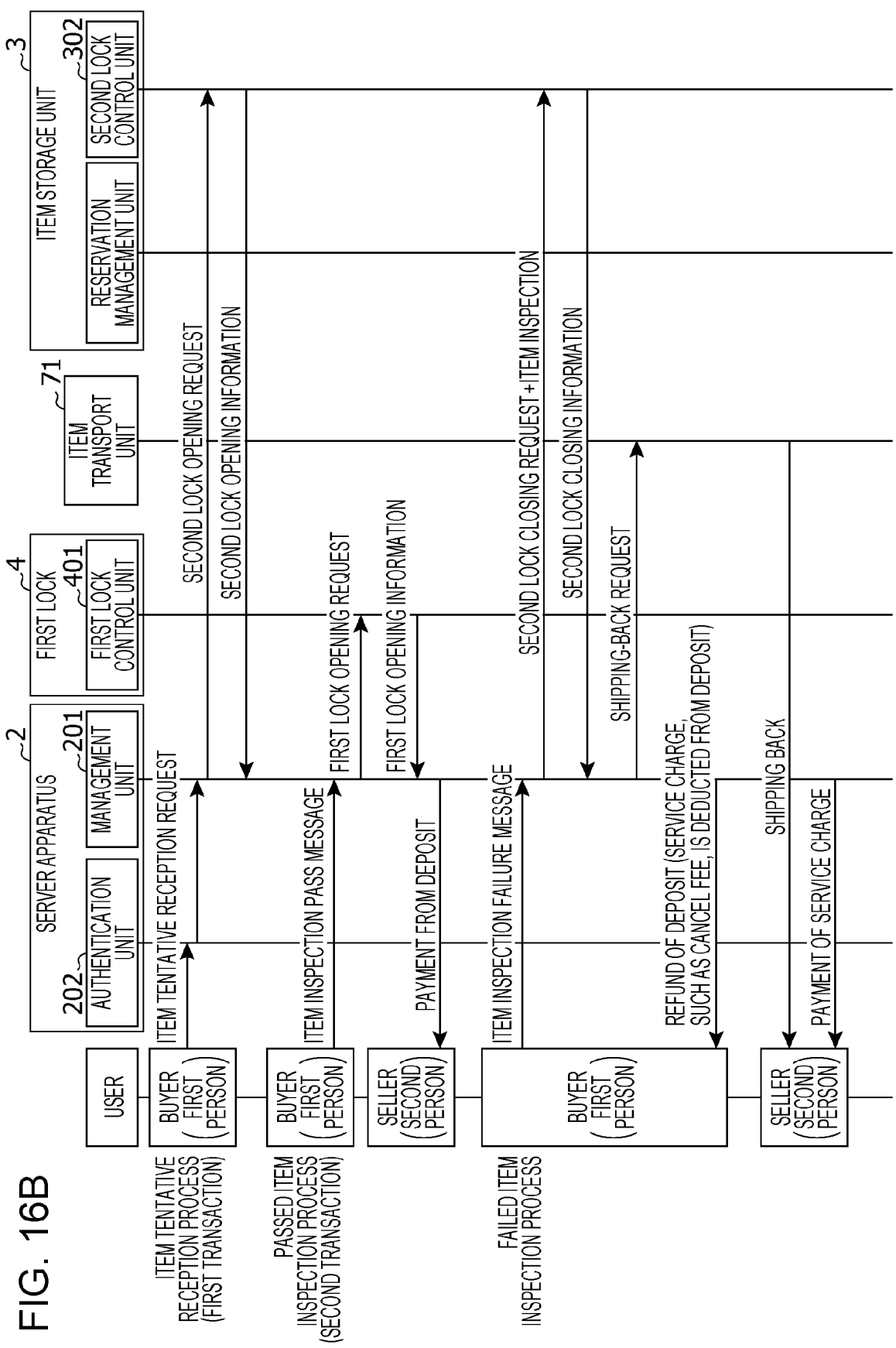

TRANSACTION MANAGEMENT SYSTEM, TRANSACTION MANAGEMENT METHOD, AND PROGRAM

CROSS-REFERENCE TO RELATED APPLICATIONS

This application is a Continuation of U.S. patent application Ser. No. 16/163,676, filed on Oct. 18, 2018, which claims the benefit of U.S. Provisional Patent Application No. 62/587,055, filed Nov. 16, 2017, and priority to Japanese Application No. 2018-112171, filed on Jun. 12, 2018. The disclosure of each of these documents, including the specification, drawings, and claims, is incorporated herein by reference in its entirety.

BACKGROUND

1. Technical Field

The present disclosure relates to a transaction management system, a transaction management method, and a program.

2. Description of the Related Art

For example, Japanese Unexamined Patent Application Publication No. 2003-242376 describes a system that provides an item transfer medium located at a predetermined base, such as a locker at a train station, so that transfer of an item is available without face-to-face contact. In Japanese Unexamined Patent Application Publication No. 2003-242376, it is determined that transfer of an item is completed on the condition that when the door of an item transfer medium is unlocked and opened and, thereafter, the door is closed, the item is not detected in the item transfer medium by a sensor.

SUMMARY

However, according to Japanese Unexamined Patent Application Publication No. 2003-242376, completion of transfer is determined by a sensor that determines whether the item can be detected after the door is closed. Consequently, even when there is some problem with the item and the recipient is unsatisfied with the item, it is determined that sales transaction of the item is concluded. Examples of an improper item include an item different from one the recipient ordered and a malfunctioning electronic gear. That is, the recipient needs to determine whether to receive (or accept) the item only by the appearance of the item stored in the item transfer medium. Therefore, if the recipient cannot determine if an item stored in an item transfer medium is an improper item, transaction of the item is concluded, which is problematic.

One non-limiting and exemplary embodiment provides a transaction management system, a transaction management method, and a program capable of more reliably executing sales transaction of a proper item without face-to-face contact.

In one general aspect, the techniques disclosed here feature a management system for managing a transaction of an item between a first user and a second user. The management system includes a first lock that is at least openable through an electronic process so as to be attached to the item or be removed from the item after being opened, a storage unit having a second lock attached thereto, where the second lock is at least openable through an electronic process and the storage unit is capable of physically storing the item, and a processor that performs management tasks relating to holders of lock opening privileges and management tasks relating to a transaction involving an item, where the lock opening privileges includes a first privilege to open the first lock and a second privilege to open the second lock. If the first user is a holder of the first privilege and the second privilege, the first user is permitted to open the second lock and pick up the item from the storage unit and is permitted to open the first lock attached to the item and remove the first lock from the item. Upon receiving, from the storage unit, information indicating that the second lock is opened, the processor performs management tasks on the basis that a first transaction is concluded in which the first user tentatively receives the item from the second user. Upon receiving, from the first lock, information indicating that the first lock is opened, the processor performs management tasks on the basis that a second transaction is concluded in which the first user inspects the item and finally receives the item.

According to the transaction management system of the present disclosure, proper sales transaction of an item can be carried out more reliably without face-to-face contact.

It should be noted that general or specific embodiments may be implemented as a system, a method, an integrated circuit, a computer program, a computer-readable storage medium, such as a compact disc-read only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 16B is a sequence diagram illustrating an example of the operation performed by the transaction management system according to the example.

DETAILED DESCRIPTION

Figure 1:
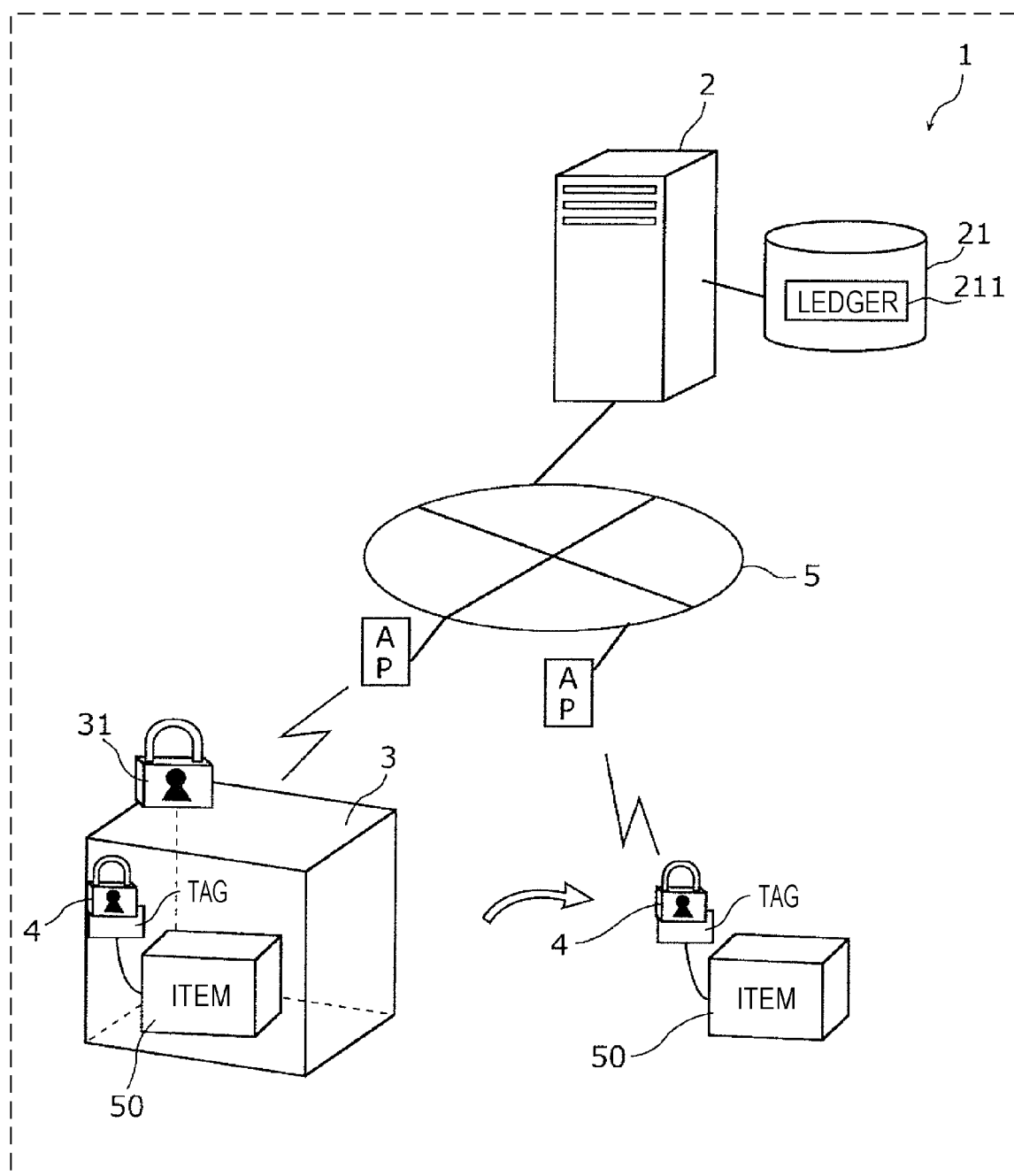
FIG. 1 is a diagram illustrating an example of a configuration of a transaction management system according to an embodiment.

According to an aspect of the present disclosure, a management system for managing a transaction of an item between a first user and a second user is provided. The management system includes a first lock that is at least openable through an electronic process so as to be attached to the item or be removed from the item after being opened, a storage unit having a second lock attached thereto, where the second lock is at least openable through an electronic process and the storage unit is capable of physically storing the item, and a processor that performs management tasks relating to holders of lock opening privileges and management tasks relating to a transaction involving an item, where the lock opening privileges includes a first privilege to open the first lock and a second privilege to open the second lock. If the first user is a holder of the first privilege and the second privilege, the first user is permitted to open the second lock and pick up the item from the storage unit and is permitted to open the first lock attached to the item and remove the first lock from the item. Upon receiving, from the storage unit, information indicating that the second lock is opened, the processor performs management tasks on the basis that a first transaction is concluded in which the first user tentatively receives the item from the second user. Upon receiving, from the first lock, information indicating that the first lock is opened, the processor performs management tasks on the basis that a second transaction is concluded in which the first user inspects the item and finally receives the item.

According to the above-described configuration, the management system can prevent the first person, who is the recipient of the item, from receiving the item that is unacceptable by using, as the transaction history of transfer of the item, the open/close history of the first lock and the second lock opened and closed through an electronic process. In addition, even when the first person has received the item that is unacceptable, the first person can ship back the item or request for a replacement process to the second person who has delivered the item in an appropriate manner, since the transaction history of the transfer of the item fully remains as digital evidence. That is, according to the configuration, the management system can provide more reliable transaction involving transfer of the item without face-to-face contact. As a result, a fraudulent item and a fraudulent transaction can be prevented. Thus, the number of fraudulent items can be reduced, and energy consumption required for return or replacement of the item can be reduced. In this manner, energy saving can be achieved.

In addition, for example, a history of the opening of the first lock and a history of the opening of the second lock are recorded in a ledger in the management tasks relating to a transaction or the management tasks relating to a holder of the lock opening privilege. If in the management tasks relating to the transaction, information indicating that the second lock is opened is acquired from the storage unit and the information indicating that the second lock is opened is recorded in the ledger, the processor performs management tasks on the basis that the first transaction is concluded. If information indicating that the first lock is opened is recorded in the ledger, the processor performs management tasks on the basis that the second transaction is concluded.

In addition, for example, the ledger may be blockchain-based distributed ledgers, and the processor may perform management tasks relating to a holder of the lock opening privilege so as to accumulate registration of the first privilege and the second privilege as a history.

In addition, for example, the management system may further include a sensor that detects that the first lock is broken. If information indicating that the first lock is broken is acquired from the sensor and information indicating that the first lock is opened is recorded in the ledger, the processor may perform management tasks relating to a transaction on the basis that the second transaction is concluded.

In addition, for example, if after the first transaction is executed, the first user inspects the item and does not finally receive (or accept) the item as the result of inspection, the item may be shipped back to the second user. If a predetermined period of time elapses from the time the processer performs management tasks relating to a transaction on the basis that the first transaction is concluded without the first lock being opened and without the first user shipping the item back to the second user, the processor may perform management tasks on the basis that the second transaction is concluded.

In addition, for example, the first lock may be in the form of a tag, and the first lock may be tied to the item so as to be attached to the item.

In addition, for example, after the processor performs management tasks relating to a transaction on the basis that the first transaction is concluded, if the first lock is not opened and if the item is physically stored in the storage unit and the second lock is closed, the processor may perform management tasks relating to a transaction on the basis that the second transaction is not concluded.

In addition, for example, the storage unit may further include an RFID reader, and the first lock or the item may further has an RFID attached thereto. After the processor performs management tasks relating to a transaction on the basis that the first transaction is concluded, if the processor acquires, from the storage unit, information indicating that the storage unit reads the RFID by using the RFID reader and determines that the item is physically stored in the storage unit and, thereafter, the second lock is closed and if the first lock is not opened, the processor may perform management tasks relating to a transaction on the basis that the second transaction is not concluded.

In addition, for example, the first user may be a buyer, the second user may be a seller, and the item may be an item offered by the second user. The first transaction may be a transaction in which the first user determines whether the item is an item that the first user wants to purchase before deciding purchase of the item, and the second transaction may be a transaction in which the first user decides the purchase of the item.

In addition, for example, the management tasks may further include a task in which the management system receives and temporarily keeps a payment amount in an electromagnetic manner. If the processor performs management tasks relating to a transaction on the basis that the second transaction is concluded, the management system may remit the payment amount to the second user. If the processor performs management tasks relating to a transaction on the basis that the second transaction is not concluded, the management system may return the payment to the first user.

Note that each of the embodiments below describes a general or specific example. A value, a shape, a constituent element, steps, and the sequence of steps used in the embodiments are only examples and shall not be construed as limiting the scope of the present disclosure. In addition, among the constituent elements in the embodiments described below, the constituent element that does not appear in an independent claim, which has the broadest scope, is described as an optional constituent element. In addition, all the embodiments may be combined in any way.

Embodiments

A transaction management system 1 according to an embodiment is described below with reference to the accompanying drawings.
Configuration of Transaction Management System FIG. 1 is a diagram illustrating an example of a configuration of a transaction management system 1 according to the present embodiment.

As illustrated in FIG. 1, the transaction management system 1 includes a server apparatus 2 connected to a storage device 21, an item storage unit 3 having a second lock 31 attached thereto, and a first lock 4 attached to an item 50. The server apparatus 2 and the item storage unit 3 are connected to each other via a network 5. In addition, the server apparatus 2 and the first lock 4 are connected to each other via the network 5. Note that the item 50 is a substantive item, such as a commercial product. For example, the item 50 may be an original item, such as a painting or a jewel, or electronic gear, such as a game machine. That is, the item 50 is an item that cannot be determined as a proper item by its appearance. Note that the item 50 may also be an item that can be determined as a proper item by its appearance.

Figure 2:
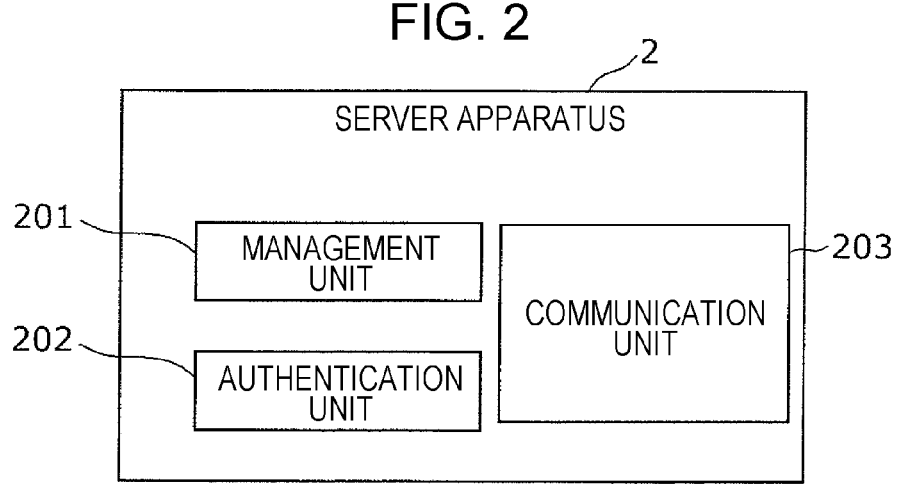
FIG. 2 is a block diagram illustrating an example of a configuration of a server apparatus illustrated in FIG. 1.
Figure 3:
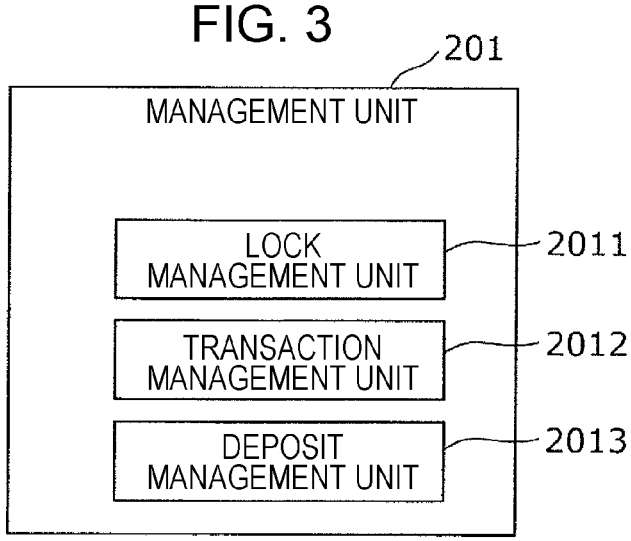
FIG. 3 is a block diagram illustrating an example of a detailed configuration of a management unit illustrated in FIG. 2.
Figure 4:
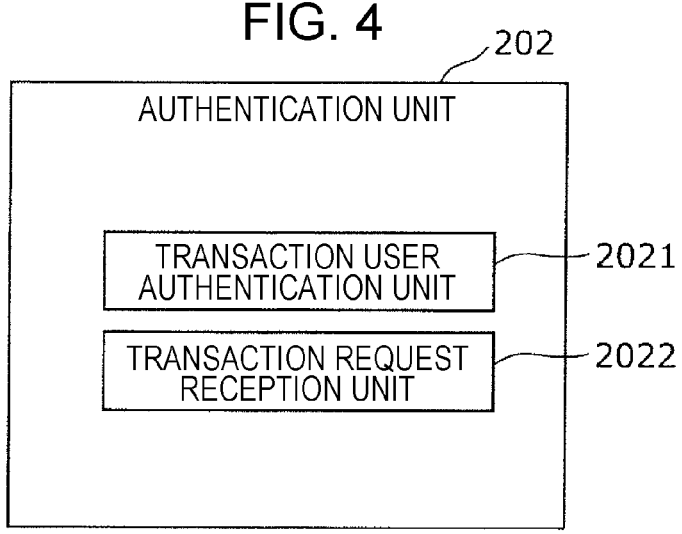
FIG. 4 is a block diagram illustrating an example of a detailed configuration of an authentication unit illustrated in FIG. 2.

The transaction management system 1 manages a transaction involving the transfer of the item 50 between a first person and a second person. According to the present embodiment, the transaction management system 1 can record, as digital evidence, the transaction involving the transfer of the item 50 by using the open/close history of the first lock 4 and the open/close history of the second lock 31. As a result, the transaction management system 1 can guarantee receipt of an item and the like.
Server Apparatus FIG. 2 is a block diagram illustrating an example of a configuration of the server apparatus 2 illustrated in FIG. 1. FIG. 3 is a block diagram illustrating an example of a detailed configuration of the management unit 201 illustrated in FIG. 2. FIG. 4 is a block diagram illustrating an example of a detailed configuration of an authentication unit 202 illustrated in FIG. 2.

The server apparatus 2 is provided in the form of, for example, a computer including a memory. As illustrated in FIG. 2, the server apparatus 2 includes a management unit 201, an authentication unit (or authenticator) 202, and a communication unit (or communicator) 203. The server apparatus 2 is connected to the storage device 21. The server apparatus 2 may be connected to the storage device 21 via the network 5 or may have the storage device 21 therein. The storage device 21 has a ledger 211 that enables data to be electronically recorded.
Management Unit The management unit 201 manages the ledger 211 in the storage device 21. In addition, the management unit 201 manages a first lock opening privilege to open and close the first lock 4, a second lock opening privilege to open and close the second lock 31, and the transaction related to the item 50. The management unit 201 records, in the ledger 211, the history of opening and closing of the first lock 4 and the history of opening and closing of the second lock 31. According to the present embodiment, for example, as illustrated in FIG. 3, the management unit 201 includes a lock management unit (or lock manager) 2011, a transaction management unit (or transaction manager) 2012, and a deposit management unit (or deposit manager) 2013. Note that the management unit 201 does not necessarily have to include the deposit management unit 2013.
Lock Management Unit The lock management unit 2011 manages the first lock opening privilege to open and close the first lock 4 and the second lock opening privilege to open and close the second lock 31. The lock management unit 2011 performs the management task of registering the information indicating that the first person has the first lock opening privilege and the second lock opening privilege. In this manner, the lock management unit 2011 allows the first person to open the second lock 31 attached to the item storage unit 3 and pick up the item 50 from the item storage unit 3. In addition, the lock management unit 2011 allows the first person to open the first lock 4 attached to the item 50 and remove the first lock 4 from the item 50. More specifically, the lock management unit 2011 accumulates the registration or transfer of the first lock opening privilege and the second lock opening privilege as the history. Thus, the lock management unit 2011 manages the first lock opening privilege and the second lock opening privilege. In addition, the lock management unit 2011 manages opening and closing of each of the first lock 4 and the second lock 31. For example, after the authentication unit 202 performs an authentication process described below, the lock management unit 2011 records, in the ledger 211, a user who has the first lock opening privilege and the second lock opening privilege. In this manner, the lock management unit 2011 accumulates the registration or transfer of a person having the first lock opening privilege and the second lock opening privilege as the history.

According to the present embodiment, the lock management unit 2011 accumulates, in the ledger 211, the registration or transfer of persons having the first lock opening privilege and the second lock opening privilege as a history. In an example, suppose that the lock management unit 2011 receives, from the transaction request reception unit (or transaction request receiver) 2022, a request for a transaction involving the transfer of the item 50, such as a shipment process request, a tentative reception request, or a final reception request from a person having the first lock opening privilege and the second lock opening privilege. Then, the lock management unit 2011 records, in the ledger 211, the person having the first lock opening privilege and the second lock opening privilege and records, in the ledger 211, registration or transfer of the person having the first lock opening privilege and the second lock opening privilege.

Note that the lock management unit 2011 records, in the ledger 211, first lock identification information, which is information for identifying the first lock 4. In addition, the lock management unit 2011 may record, in the ledger 211, the identifier assigned to the item 50 for uniquely identifying the item 50. Furthermore, the lock management unit 2011 may uniquely identify the second lock 31 by using an identifier assigned to the second lock 31 for uniquely identifying the second lock 31 or may identify the item storage unit 3 by using an identifier assigned to the item storage unit 3 having the second lock 31 attached thereto.

Furthermore, the lock management unit 2011 may manage the information indicating that the first lock 4 is opened or closed and the information indicating that the second lock 31 is opened or closed. For example, upon receiving a notification from a first lock control unit 401 that controls the first lock 4 (described in more detail below), the lock management unit 2011 may accumulate the information indicating that the first lock 4 is opened or closed as a history. In this manner, the lock management unit 2011 may manage the open/close history of the first lock 4. In addition, upon receiving a notification from the second lock control unit 302 of the item storage unit 3 (described in more detail below), the lock management unit 2011 may accumulate the information indicating that the second lock 31 is opened or closed as a history. In this manner, the lock management unit 2011 may manage the open/close history of the second lock 31. Note that the open/close history may include only the open history.

As described above, the lock management unit 2011 manages the person having the first lock opening privilege and the person having the second lock opening privilege by executing the ledger procedure for recording the information in the ledger 211. The lock management unit 2011 may further manage the open/close history of the first lock 4 and the open/close history of the second lock 31. Note that the operations of the lock management unit 2011 are not limited to management of the lock open history of the second lock 31 by using the ledger 211. The lock management unit 2011 may manage the lock open history of the second lock 31 by recording, in another ledger stored in the storage device 21 or an area of the storage device 21, information indicating that the second lock 31 is opened or closed.

Transaction Management Unit

The transaction management unit 2012 manages the transaction related to the item 50. Upon receiving, from the item storage unit 3, information indicating that the second lock 31 of the item storage unit 3 storing the item 50 is opened, the transaction management unit 2012 performs management tasks on the basis that a first transaction is concluded in which the first person tentatively receives the item 50 from the second person. In addition, upon receiving, from the first lock 4, information indicating that the first lock 4 is opened, the transaction management unit 2012 performs management tasks on the basis that a second transaction is concluded in which the first person finally receives the item 50 after inspecting the item 50. Note that in the case where the first lock 4 is not opened after conclusion of the first transaction, if the item 50 is physically stored in the item storage unit 3 and, thereafter, the second lock 31 is closed, the transaction management unit 2012 may perform management tasks on the basis that the second transaction is not concluded.

More specifically, if the transaction management unit 2012 receives, from the item storage unit 3, the information indicating that the second lock 31 of the item storage unit 3 storing the item 50 is opened and, thereafter, the information indicating that the second lock 31 is opened is recorded in the ledger 211, the transaction management unit 2012 performs management tasks on the basis that the first transaction is concluded. In addition, when the information indicating that the first lock 4 is opened is recorded in the ledger 211, the transaction management unit 2012 performs management tasks on the basis that the second transaction is concluded.

Note that the item 50 is received by the first person through the first transaction and the second transaction. More specifically, after the first transaction is executed in which the item 50 is tentatively received by the first person, the first person inspects whether the item 50 is an improper item. If, as a result of inspection, the first person determines to finally receive the item 50, the second transaction in which the item 50 is finally received by the first person is executed. If the first person determines not to finally receive the item 50, the item 50 is returned to the second person, and a second transaction is not executed.

According to the present embodiment, the transaction management unit 2012 records, in the ledger 211, information indicating that each of the second lock 31 and the first lock 4 is opened or closed so as to manage whether each of the first transaction and the second transaction is concluded. For example, the transaction management unit 2012 receives a notification from the first lock control unit 401 (described in more detail below) of the first lock 4 when the first lock 4 is opened. The transaction management unit 2012 records, in the ledger 211, the information indicating that the first lock 4 is opened and performs management tasks on the basis that the second transaction is concluded. In addition, when the transaction management unit 2012 receives, from a second lock control unit 302 (described in more detail below) of the item storage unit 3, a notification indicating that the second lock 31 is opened and, thus, records, in the ledger 211, the information indicating that the second lock 31 is opened, the transaction management unit 2012 may perform management tasks on the basis that the first transaction is concluded. Note that the transaction management unit 2012 may perform management tasks on the basis that the second transaction is concluded when the information indicating that the first lock 4 is opened is recorded in the ledger 211 by the lock management unit 2011. Similarly, the transaction management unit 2012 may perform management tasks on the basis that the first transaction is concluded when the information indicating that the second lock 31 is opened is recorded in the ledger 211 by the lock management unit 2011. Furthermore, the transaction management unit 2012 may record, in the ledger 211, information indicating that the first transaction has been concluded after recording the opening of the first lock 4. Similarly, the transaction management unit 2012 may record, in the ledger 211, information indicating that the second transaction has been concluded after recording the opening of the second lock 31.

As described above, the transaction management unit 2012 may uniquely identify the second lock 31 by using the identifier assigned to uniquely identify the second lock 31 or by using the identifier assigned to uniquely identify the item storage unit 3 having the second lock 31 attached thereto.

In addition, the transaction management unit 2012 may manage the ownership of the item 50 by using an area of the storage device 21 allocated in advance or the ledger 211. More specifically, the transaction management unit 2012 may manage the ownership of the item 50 by accumulating registration and transfer of the ownership of the item 50 as a history. Note that the transaction management unit 2012 manages the item 50 having the first lock 4 attached thereto by using information for identifying the item 50. The information for identifying the item 50 may be, for example, an identifier assigned to uniquely identifying the item 50 or an identifier assigned to uniquely identify the first lock 4.

In addition, the transaction management unit 2012 may manage the item information about the item 50, which is information relating to the item 50, by recording the information relating to the item 50 in the area of the storage device 21 allocated in advance or the ledger 211. For example, the item information relating to the item 50 includes information indicating that the item 50 is the electronic gear A and consists of one or more parts B, information indicating that the manufacturer is B company, and information indicating that the second person is C. That is, the item information relating to the item 50 is information including the attributes of the item 50 that are necessary for the transfer of the item 50. Note that the transaction management unit 2012 may perform management tasks by setting, in the item information relating to the item 50, the item identification information for identifying the item 50. As described above, the information for identifying the item 50 can be, for example, an identifier assigned to uniquely identify the item 50 or an identifier assigned to uniquely identify the first lock 4.

In addition, when the second person completes the shipment process of the item 50, the transaction management unit 2012 may manage an item shipment notification information indicating that the second person has completed the arrangement to ship the item 50 by using a courier and the item is about to be shipped. The item shipment notification information may be generated by an operation performed by the second person or may be generated when preparation for shipment of the item 50 by the second person is completed and a predetermined operation is performed.

In this way, the transaction management unit 2012 uses the open/close history of each of the first lock and the second lock which are opened and closed through electronic processing as the history of transaction involving the transfer of the item. Note that the transaction management unit 2012 may further record, in the ledger 211, the processing or transaction of the item 50 having the first lock 4 attached thereto other than the above-described first transaction and second transaction.

Note that if, after performing management tasks on the basis that the first transaction is concluded, a period of time during which the first lock 4 is not opened and, thus, the item 50 is not returned from the first person to the second person exceeds a predetermined period of time, the transaction management unit 2012 may perform management tasks on the basis that the second transaction is concluded. In addition, if the transaction management unit 2012 receives information indicating that the first lock 4 is broken open and, thus, information indicating that the first lock 4 is opened is recorded, the transaction management unit 2012 may perform management tasks on the basis that the second transaction is concluded.

Deposit Management Unit

The deposit management unit 2013 performs the management task of temporarily keeping a payment amount of the first person in an electromagnetic manner when payment is involved in the transaction involving the transfer of the item 50. If management tasks on the basis that the second transaction is concluded are performed by the transaction management unit 2012, the deposit management unit 2013 remits the payment amount to the second person.

However, if management tasks on the basis that the second transaction is not concluded are performed by the transaction management unit 2012, the deposit management unit 2013 returns the payment to the first person.

When the transaction involving the transfer of the item 50 is a transaction involving the transfer of the item 50 for sale, the transaction involving the transfer of the item 50 is a financial transaction. If, for example, the transaction involving the transfer of the item 50 is not a financial transaction, the deposit management unit 2013 is not needed. That is, the deposit management unit 2013 is not essential constituent element.

Authentication Unit

The authentication unit 202 performs at least an authentication process for determining whether the user requesting the transaction involving the transfer of the item 50 is an authorized user. According to the present embodiment, for example, as illustrated in FIG. 4, the authentication unit 202 includes a transaction user authentication unit (or transaction user authenticator) 2021 and a transaction request reception unit 2022. Note that the authentication process is performed when the user sends, from a terminal that the user uses or carries with them to the server apparatus 2, a shipment process request, a delivery process request, a first lock opening request, a second lock opening request, a first lock closing request, a second lock closing request, a tentative reception request, or a final reception request. It is desirable that the authentication process be performed by using, for example, a public key infrastructure (PKI) that uses a public key and a secret key. The terminal may be, for example, a personal computer or a mobile terminal, such as a tablet or a smartphone. Hereinafter, the transaction user is simply referred to as a "user".

Transaction User Authentication Unit

The transaction user authentication unit 2021 performs an authentication process to determine whether the user is an authorized transaction user, that is, the user requesting the transaction involving the transfer of the item 50 is an authorized transaction user. Here, the transaction user, that is, the user is, for example, a second person who is a sender of the item 50, a first person who is a receiver of the item 50, or a courier who delivers the item 50. In addition, the transaction involving the transfer of the item 50 is performed by attaching the first lock 4 to the item 50 and closing the first lock 4, registering the item information, registering the first lock opening privilege, tentatively receiving the item 50, and finally receiving the item 50. The transaction involving the transfer of the item 50 may include a transaction involving opening and closing of the second lock 31 attached to the item storage unit 3.

More specifically, when a user requests the transaction involving the transfer of the item 50 from a terminal, such as a smartphone, to the server apparatus 2, the transaction user authentication unit 2021 verifies whether the user is an authorized transaction user. For example, the transaction user authentication unit 2021 verifies whether the user who has sent a shipment process request to ship the item 50, such as closing the first lock 4 attached to the item 50 and registering the first lock opening privilege, is a user having an ownership managed by the lock management unit 2011. As used herein, the term "user having an ownership" refers to a user having the ownership of the item 50 and a user having the ownership of the item 50 uniquely identifiable by information for identifying the item 50. Thereafter, if the transaction user authentication unit 2021 verifies that the user is an authorized transaction user, the transaction user authentication unit 2021 sends a request for the transaction involving the transfer of the item 50 to the transaction request reception unit 2022.

Note that the request for the transaction involving the transfer of the item 50 is not limited to the above-described shipment process request. The request for the transaction involving the transfer of the item 50 may be a delivery process request for delivering the item 50, a tentative reception request for tentatively receiving the item 50, a final reception request for finally receiving the item 50, or another request described below.

Transaction Request Reception Unit

Upon receiving, from the transaction user authentication unit 2021, the request for the transaction involving the transfer of the item 50, the transaction request reception unit 2022 performs a reception process to receive a request for transaction involving the item 50. For example, the transaction request reception unit 2022 performs a reception process to receive the shipment process request for shipping the item 50. The transaction request reception unit 2022 sends, to the lock management unit 2011, the received request for the transaction involving the transfer of the item 50, sends the request to the transaction management unit 2012, sends the request to the item storage unit 3 (described in more detail below), and sends the request to the first lock 4.

Communication Unit

The communication unit 203 is configured by, for example, a processor and a communication I/F. The communication unit 203 has a function of communicating with the first lock 4 attached to the item 50, communicating with the item storage unit 3 in which the item 50 is to be stored, and communicating with a terminal of the user. According to the present embodiment, the communication unit 203 communicates with a communication unit 303 (described in more detail below) of the item storage unit 3 via wired communication, such as a wired LAN, or wireless communication, communicates with a communication unit 403 of the first lock 4, and communicates with the terminal of the user. Examples of a wireless communication technology include BLE (Bluetooth (registered trademark) Low Energy) and LPWA (Low Power Wide Area). Alternatively, 4G (4th generation mobile communication system) or 5G (5th generation mobile communication system) may be used.

Item Storage

Figure 5:
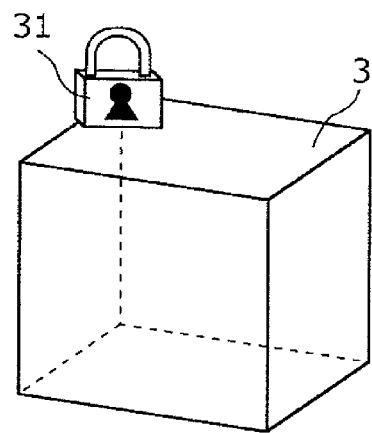
FIG. 5 is a schematic diagram illustrating an example of the appearance of an item storage unit illustrated in FIG. 1.
Figure 6:
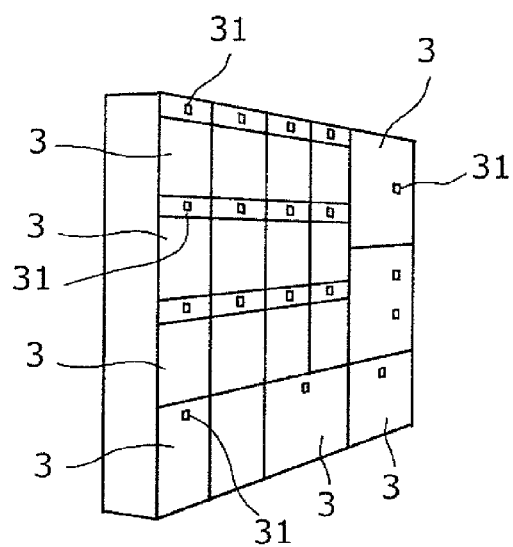
FIG. 6 is a schematic diagram illustrating another example of the appearance of the item storage unit according to the embodiment.
Figure 7:
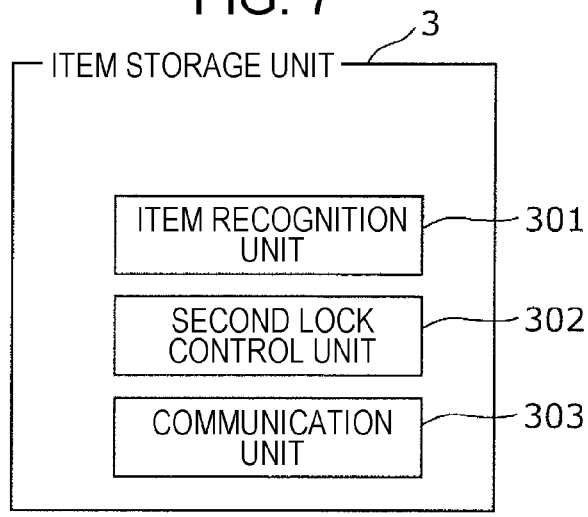
FIG. 7 is a block diagram illustrating an example of a detailed configuration of the item storage unit according to the embodiment.

FIG. 5 is a schematic diagram illustrating the appearance of an example of the item storage unit 3 illustrated in FIG. 1. FIG. 6 is a schematic diagram illustrating the appearance of another example of the item storage unit 3 according to the present embodiment. FIG. 7 is a block diagram illustrating an example of a detailed configuration of the item storage unit 3 according to the present embodiment.

The item storage unit 3 is provided with a second lock 31 which is opened and closed by electronic processing. The item storage unit 3 can physically store the item 50. The item storage unit 3 may be installed at a place or a spot the first person can easily go to and receive the item 50. Alternatively, the item storage unit 3 may be delivered with the item 50 stored therein. That is, the item storage unit 3 may be an object having the second lock 31 attached thereto and installed at a given place. Note that the second lock 31 is opened and closed by an electronic process. Alternatively, the item storage unit 3 may be a package of the item to be delivered.

Suppose that the item storage unit 3 is, for example, a case or a box as illustrated in FIG. 5. In this case, the item storage unit 3 may be a package containing the item 50 with the first lock 4 attached thereto. Alternatively, the item storage unit 3 may be a delivery locker reserved for the first person and installed at a predetermined location in the first person's home or apartment house. When the item storage unit 3 is a package, the item storage unit 3 may be delivered to the first person by a courier.

Note that the item storage unit 3 may be a transparent case or a non-transparent case having a hollow grid patterned surface or a long rectangular hole perforated surface so that the item 50 can be viewed with the second lock 31 closed. In addition, the item storage unit 3 can be made of a packaging material from which the item 50 can be taken out or stored by using the second lock 31. For example, the item storage unit 3 may be made of, for example, vinyl, cardboard, resin, or cloth. Alternatively, the item storage unit 3 may be made of iron, aluminum or the like. That is, the item storage unit 3 can be made of any packaging material that allows the second lock 31 to be attached thereto and allows the item 50 to be taken out therefrom or to be stored therein by using the second lock 31.

In addition, for example, as illustrated in FIG. 6, the item storage unit 3 may be one of delivery lockers of a structure including a plurality of delivery lockers, for example. In this case, the item storage unit 3 is one of storage partitions of a facility having at least one storage partition for receiving an item. The storage partition has the second lock 31 attached thereto, and the second lock 31 is opened or closed through an electronic process. The item storage unit 3 is installed in a place or a spot the first person can easily go to in order to pick up the item. Examples of the place or spot include a train station and a convenience store.

The present embodiment is described below with reference to the item storage unit 3 being a delivery locker installed at a place or spot the first person can easily go to for reception of the item.

As illustrated in FIG. 7, the item storage unit 3 further includes an item recognition unit (or item recognizer) 301, a second lock control unit (or second lock controller) 302, and a communication unit (or communicator) 303. Note that the item storage unit 3 does not necessarily include the item recognition unit 301.

Item Recognition Unit

The item recognition unit 301 recognizes whether the item 50 is stored in the item storage unit 3 by using a sensor. The sensor may be a weight sensor or a photoelectric sensor.

If the sensor is a weight sensor, the item recognition unit 301 can determine whether the item 50 is stored in the item storage unit 3 on the basis of whether the weight sensor provided at the bottom of the item storage unit 3 detects the weight. Note that the item recognition unit 301 may define, as a reference, the weight detected by the weight sensor when the item 50 is stored in the item storage unit 3 and the second lock 31 is closed. Thereafter, the item recognition unit 301 may determine whether the item is stored in the item storage unit 3 on the basis of whether the weight sensor detects a weight that differs from the weight detected as the reference.

In contrast, when the sensor is a photoelectric sensor, the item recognition unit 301 may include a phototransmitter and a photoreceiver facing each other. In this case, the item recognition unit 301 can recognize whether the item 50 is stored in the item storage unit 3 on the basis of whether the item 50 blocks the optical axis between the phototransmitter and the photoreceiver.

Note that the item recognition unit 301 may recognize whether the item 50 is stored in the item storage unit 3 by using a radio frequency identifier (RFID). More specifically, an RFID is attached to the item 50 or the first lock 4 attached to the item 50, and the item recognition unit 301 may have an RFID reader. In this case, the item recognition unit 301 can recognize whether the item 50 is stored in the item storage unit 3 on the basis of whether the RFID reader of the item recognition unit 301 can read the RFID.

Second Lock Control Unit

The second lock control unit 302 can perform a second lock opening process or a second lock closing process. In the second lock opening process, the second lock 31 is opened. In the second lock closing process, the second lock 31 is closed. In addition, the second lock control unit 302 notifies the management unit 201 that the second lock 31 has been opened or the second lock 31 has been closed. For example, if the user who requested opening of the second lock 31 is the same as the user who has the second lock opening privilege, the second lock control unit 302 opens the second lock 31 so that the user can pick up the item 50 from the item storage unit 3. At the same time, the second lock control unit 302 communicates with the management unit 201 to notify that the second lock 31 has been opened. Similarly, if the user who requested closing of the second lock 31 is the same as the user who has the second lock opening privilege, the second lock control unit 302 closes the second lock 31 so that the item 50 is not picked up from the item storage unit 3. At the same time, the second lock control unit 302 communicates with the management unit 201 to notify that the second lock 31 is closed.

According to the present embodiment, if it is determined that the first person who is the user who requested opening of the second lock 31 has the second lock opening privilege, the second lock control unit 302 opens the second lock 31. At the same time, the second lock control unit 302 notifies the management unit 201 via the communication unit 303 that the second lock 31 has been opened and causes the management unit 201 to record, as a history in the ledger 211, the information indicating that the second lock 31 has been opened. Similarly, if it is determined that a courier who is the second person who is the user who requested closing of the second lock 31 has the second lock opening privilege, the second lock control unit 302 closes the second lock 31. At the same time, the second lock control unit 302 notifies the management unit 201 via the communication unit 303 that the second lock 31 has been closed and causes the management unit 201 to record, as a history in the ledger 211, the information indicating that the second lock 31 has been closed.

Note that the second lock control unit 302 may determine whether the user who requested opening or closing of the second lock 31 has the second lock opening privilege by communicating with the management unit 201 to inquire about the determination result. In this case, the second lock control unit 302 may send, to the management unit 201, the information indicating that the second lock 31 has been opened or closed together with the determination result indicating that the user who has requested opening or closing of the second lock 31 has the second lock opening privilege.

Communication Unit

The communication unit 303 includes, for example, a processor and a communication interface (I/F). The communication unit 303 has a function of communicating with the server apparatus 2. According to the present embodiment, the communication unit 303 communicates with the communication unit 203 of the server apparatus 2 through, for example, wireless communication. Techniques for performing wireless communication are the same as those described above.

First Lock

Figure 8:
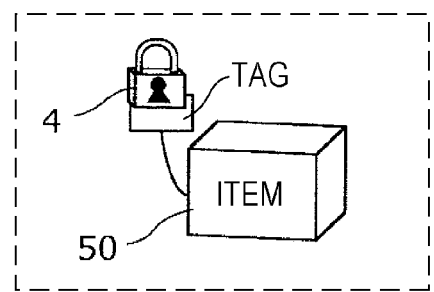
FIG. 8 is a schematic diagram illustrating an example of a first lock attached to an item illustrated in FIG. 1.
Figure 9:
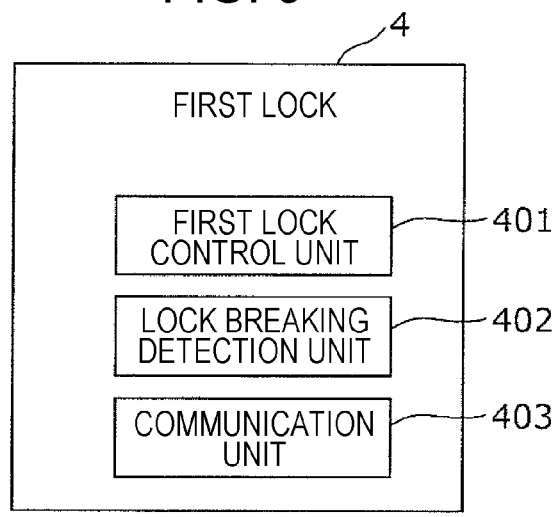
FIG. 9 is a block diagram illustrating an example of the detailed configuration of a first lock illustrated in FIG. 8.

FIG. 8 is a schematic diagram illustrating the appearance of an example of the first lock 4 attached to the item 50 illustrated in FIG. 1. FIG. 9 is a block diagram illustrating an example of the detailed configuration of the first lock 4 illustrated in FIG. 8.

The first lock 4 is attached to the item 50. The first lock 4 is opened and closed by electronic processing. After the first lock 4 is opened, the first lock 4 can be removed from the item 50. The first lock 4 may be in the form of a tag and may be attached to the item 50 by tying on. Note that even when the first lock 4 is attached to the item 50, the first lock 4 does not interfere with the function of the item 50. That is, even when the first lock 4 is attached to the item 50, the function of the item 50 can be performed. As a result, operation check of the item 50, for example, can be made.

According to the present embodiment, the first lock 4 further includes the first lock control unit (or first lock controller) 401, a lock breaking detection unit (or lock break defector) 402, and the communication unit (or communicator) 403, as illustrated in FIG. 9. Note that the first lock 4 does not necessarily include the lock breaking detection unit 402.

First Lock Control Unit

The first lock control unit 401 can perform the first lock opening process in which the first lock 4 is opened. In addition, the first lock control unit 401 can close the first lock 4. Furthermore, the first lock control unit 401 notifies the management unit 201 that the first lock 4 has been opened or the first lock 4 has been closed. For example, if the user who requested opening of the first lock 4 is the same as the user who has the first lock opening privilege, the first lock control unit 401 opens the first lock 4 so that the first lock 4 is removable from the item 50. At the same time, the first lock control unit 401 communicates with the management unit 201 to notify the management unit 201 that the first lock 4 has been opened. Similarly, if the user who requested closing of the first lock 4 is the same as the user who has the first lock opening privilege, the first lock control unit 401 closes the first lock 4 so that the first lock 4 cannot be removed from the item 50. At the same time, the first lock control unit 401 communicates with the management unit 201 to notify the management unit 201 that the first lock 4 has been closed.

According to the present embodiment, if the first lock control unit 401 determines that the first person the same as the user who requested opening of the first lock 4 has the first lock opening privilege, the first lock control unit 401 opens the first lock 4. At the same time, the first lock control unit 401 notifies, via the communication unit 403, the management unit 201 that the first lock 4 has been opened, and the management unit 201 records, as a history in the ledger 211, the information indicating that the first lock 4 is opened. Similarly, if the first lock control unit 401 determines that the second person the same as the user who requested locking of the first lock 4 has the first lock opening privilege, the first lock control unit 401 closes the first lock 4. At the same time, the first lock control unit 401 notifies, via the communication unit 403, the management unit 201 that the first lock 4 is closed. The management unit 201 records, as a history in the ledger 211, the information indicating that the first lock 4 is closed.

Note that the first lock control unit 401 may determine whether the user who requested opening or closing of the first lock 4 has the first lock opening privilege by communicating with the management unit 201 to inquire about the determination result. In this case, the first lock control unit 401 may send, to the management unit 201, the information indicating that the first lock 4 has been opened or closed together with the determination result indicating that the user who has requested opening or closing of the first lock 4 has the first lock opening privilege.

Lock Breaking Detection Unit

The lock breaking detection unit 402 detects whether the first lock 4 has been broken open by using a sensor or the like. The sensor may be a sensor for measuring the impact applied to the first lock 4 or a cutting sensor for detecting whether the tag including the first lock 4 is cut.

Upon detecting that the first lock 4 has been broken open, the lock breaking detection unit 402 notifies the management unit 201 via the communication unit 403 that the first lock 4 has been broken open.

Communication Unit

The communication unit 403 includes a processor, a communication I/F and the like. The communication unit 403 has a function of communicating with the server apparatus 2. According to the present embodiment, the communication unit 403 wirelessly communicates with the communication unit 203 of the server apparatus 2, for example. Techniques for providing wireless communication are the same as those described above.

Operation Performed by Transaction Management System

The operation performed by the transaction management system 1 having the above-described configuration is described below.

Figure 10:
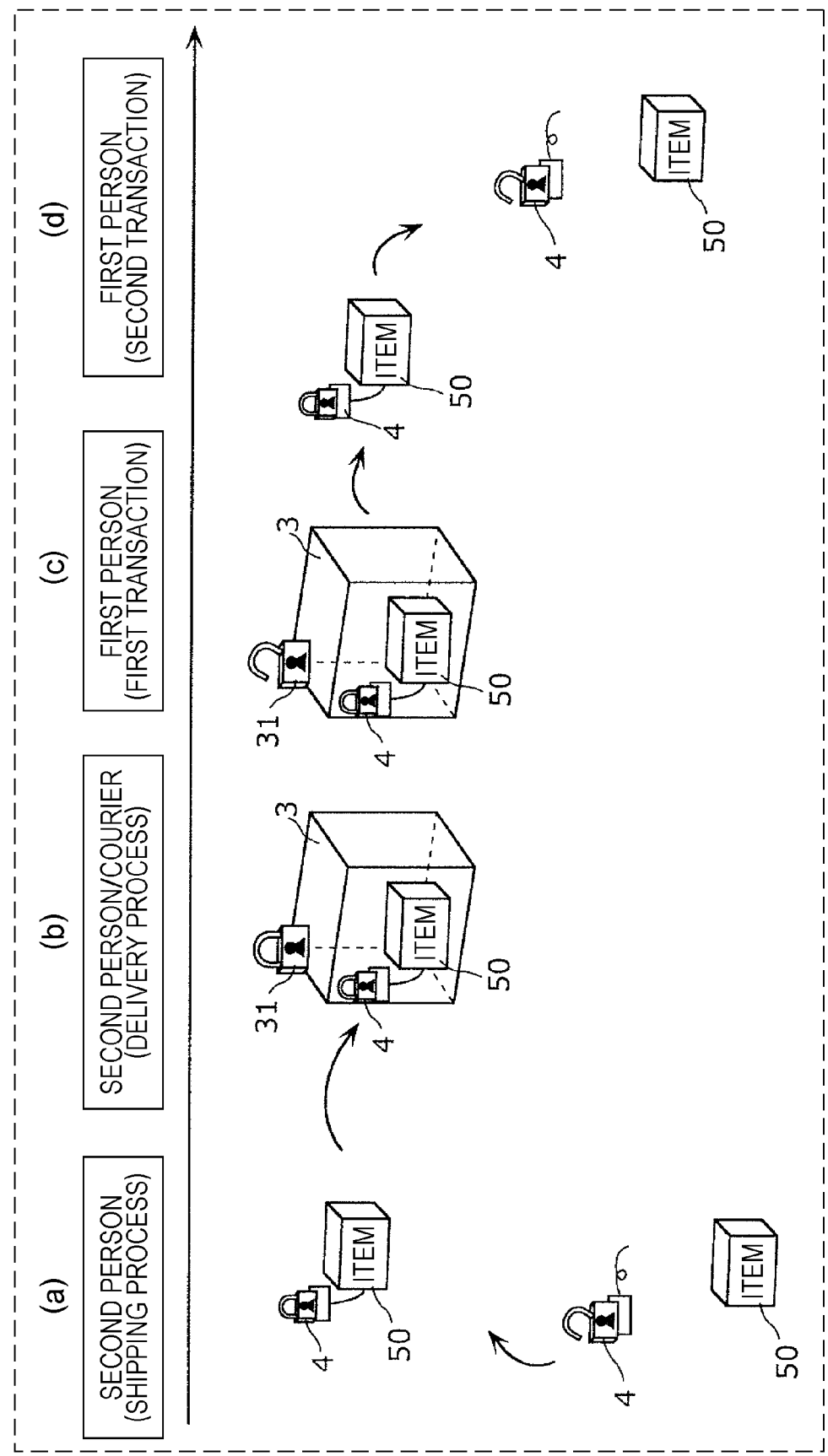
FIG. 10 is a schematic diagram illustrating the operation performed by the transaction management system according to the embodiment.
Figure 11:
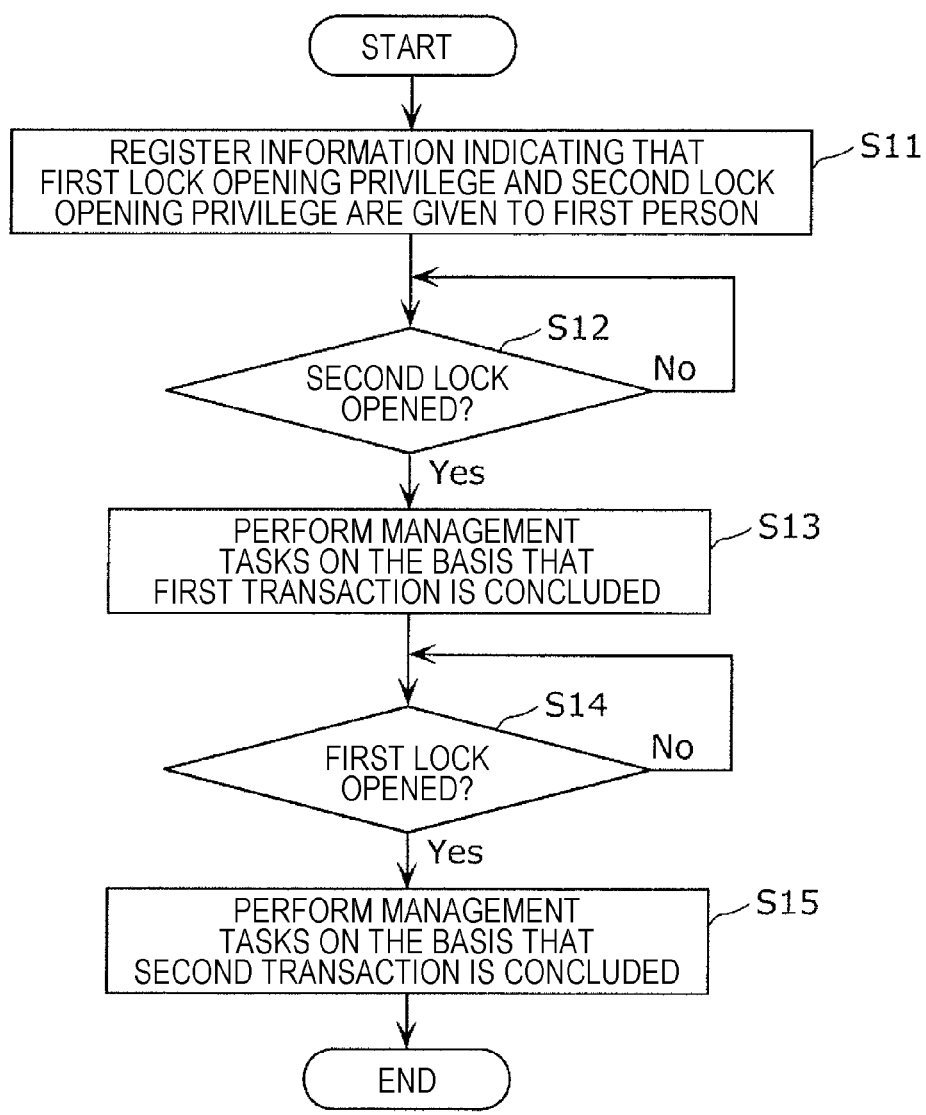
FIG. 11 is a diagram illustrating a transaction user, a lock opening privilege, and a lock opening history in a situation illustrated in FIG. 10.

FIG. 10 is a schematic diagram illustrating the operation performed by the transaction management system 1 according to the present embodiment. FIG. 11 is a diagram illustrating a transaction user, lock opening privilege, a lock opening history and the like in the situation illustrated in FIG. 10. FIGS. 10 and 11 illustrate the case in which the second person ships the item 50 to the first person and the first person receives the item 50. In the following description, the item 50 is the electronic gear A, and the item storage unit 3 is a single delivery locker located within a distance that allows the first person to pick up the item 50. FIG. 11 illustrates the case in which the identifier of the first lock 4 is recorded in the ledger 211 as the item identification information used to identify the item 50.

The second person performs a shipment process of the item 50 first when transfer of the item 50 is agreed between the second person and the first person. More specifically, the second person (the owner of the item 50) attaches the first lock 4 to the item 50 (the electronic gear A), as illustrated in FIG. 10(a). Thereafter, the second person uses the transaction management system 1 to ship the item so that "Situation 1" illustrated in FIG. 11 occurs ("Situation 1" illustrated in FIG. 11 corresponds to FIG. 10(a)). That is, the transaction user corresponds to the second person, the item identification information about the item 50 indicates the electronic gear A, the item identification information indicates the identifier of the first lock 4, the first lock opening privilege is given to the first person, and the second lock opening privilege is given to the second person or the courier. Such a transaction is executed. In addition, the second person closes the first lock 4 attached to the item 50 by using the transaction management system 1. When preparation for shipment of the item 50 is completed, the second person uses the transaction management system 1 to perform the procedure for shipping the item 50.

Note that in Situation 1 illustrated in FIG. 11, the second person merely closes the first lock 4 attached to the item 50 for the delivery process of the item 50 and does not open the first lock 4. Accordingly, "No" is set in the entry of "First lock opening history". In addition, the item 50 having the first lock 4 attached thereto is held by the second person. That is, the item 50 has not yet been stored in the item storage unit 3. Accordingly, "No" is set in the entry of "Second lock opening history".

Subsequently, as illustrated in FIG. 10(b), the second person or the courier performs a delivery process of the item 50. More specifically, the second person or the courier delivers, to the item storage unit 3, the item 50 having the closed first lock 4 attached thereto first. Thereafter, the second person or the courier stores, in the item storage unit 3, the delivered item 50 having the first lock 4 attached thereto. Subsequently, the second person or the courier executes a transaction of closing the second lock 31 of the item storage unit 3 having the item 50 stored therein by using the transaction management system 1. In addition, as indicated by Situation 2 illustrated in FIG. 11 which corresponds to FIG. 10(b), the second person or the courier executes a transaction of registering transfer of the second lock opening privilege so that the second lock opening privilege is given to the first person. The other statuses are the same as in Situation 1. That is, the transaction user is the second person or the courier, the item information about the item 50 indicates the electronic gear A, the item identification information indicates the identifier of the first lock 4, and the first lock opening privilege is given to the first person. Furthermore, in Situation 2 illustrated in FIG. 11, the second person or the courier merely performs the delivery process of delivering the item 50, storing the item 50 in the item storage unit 3, and closing the second lock 31. That is, the second person or the courier does not open the first lock 4. Accordingly, "No" is set in the entry of "first lock opening history". At this time, in FIG. 11, the lock open state of the item storage unit 3 is a usual state. In this case, only the delivery process in which the second lock 31 is closed is performed. Since the second lock 31 is not opened, "No" is set in the entry of "second lock opening history". However, the lock closed state of the item storage unit 3 may be the usual state. In this case, the second person or the courier can tentatively open the second lock 31 and stores the item. Thereafter, the second person or the courier can close the second lock 31. In this case, since the second lock 31 is once opened, "Yes" is set in the entry of "second lock opening history".

Subsequently, as illustrated in FIG. 10(c), the first person executes a first transaction to open the second lock 31 of the item storage unit 3 having the item 50 stored therein and tentatively receive the item 50. More specifically, the first person uses the transaction management system 1 to execute a transaction of opening the second lock 31 of the item storage unit 3 having the item 50 stored therein. Since, in Situation 3 illustrated in FIG. 11 corresponding to of FIG. 10(c), the first person opens the second lock 31 attached to the item storage unit 3, "Yes" is recorded in the entry of "second lock opening history" in the ledger 211. In contrast, in Situation 3 illustrated in FIG. 11, since the first person has not opened the first lock 4, "No" is set in the entry of "first lock opening history". Thus, the first person can tentatively receive the item 50 with the closed first lock 4 attached thereto. Thereafter, the first person can take the item to a predetermined place, such as home, and inspect whether the item 50 (the electronic gear A) having the closed first lock 4 attached thereto operates normally. In this manner, the first person can determine whether the item 50 is unacceptable or not.

Subsequently, as illustrated in FIG. 10(*d*), the first person executes a second transaction to open the first lock 4 attached to the item 50 and finally receive the item 50. More specifically, if the first person determines that the item 50 operates normally and, thus, the item 50 is acceptable, the first person opens the first lock 4 attached to the item 50 by using the transaction management system 1. Note that the first person has opened the first lock 4 attached to the item 50 in Situation 4 illustrated in FIG. 11 corresponding to FIG. 10(*d*), so that the "Yes" is recorded for the first lock opening history in the ledger 211. In addition, in Situation 4 illustrated in FIG. 11, since the first person has not opened the second lock 31, "No" is recorded for the second lock opening history. As a result, the first person can open the first lock 4 attached to the item 50, remove the first lock 4 from the item 50, and finally receive and own the item 50.

Figure 12:
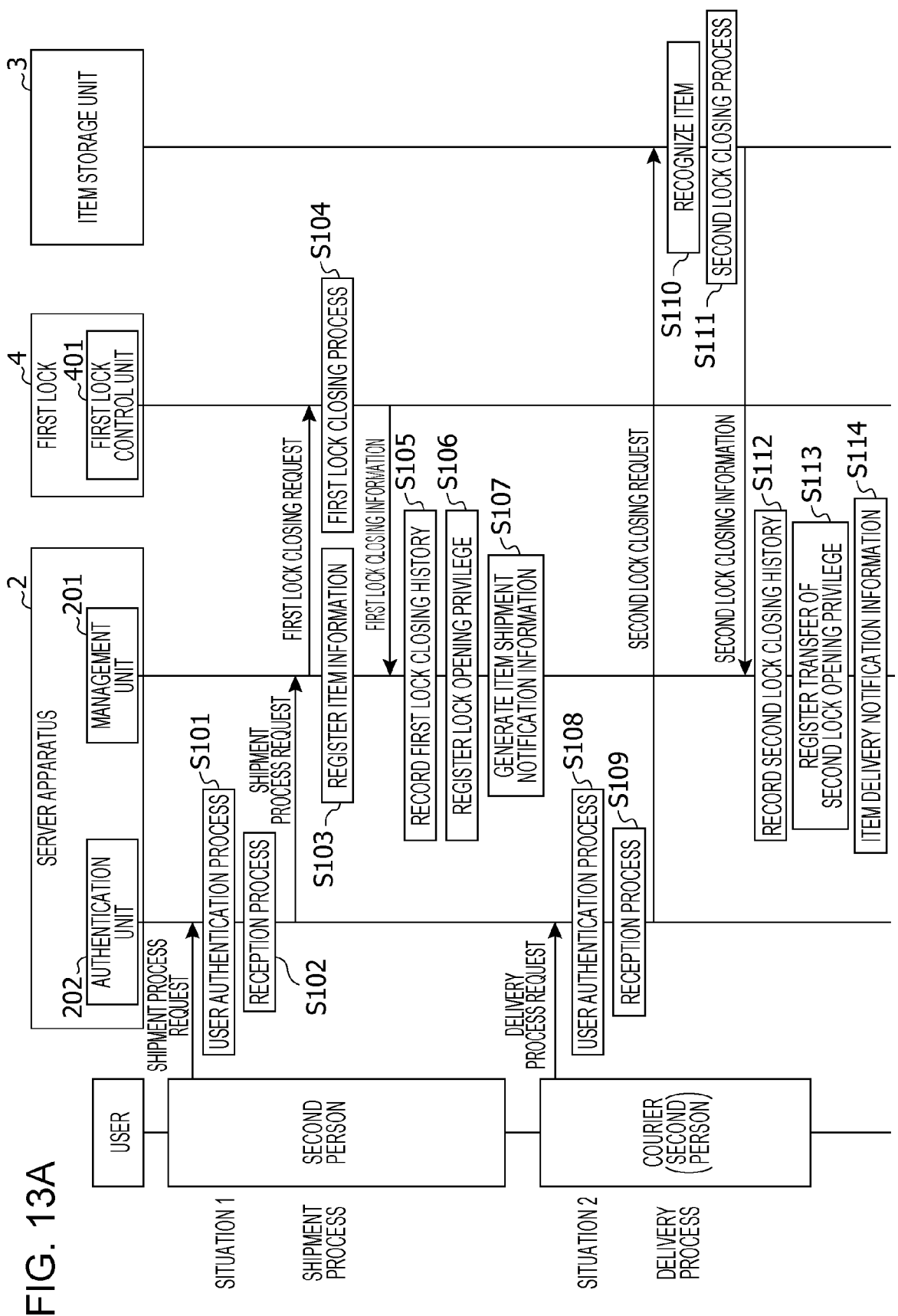
FIG. 12 is a flowchart illustrating an example of a characteristic operation of the transaction management system according to the embodiment.

FIG. 12 is a flowchart illustrating an example of a characteristic operation performed by the transaction management system 1 according to the present embodiment. More specifically, FIG. 12 is a flowchart illustrating a process in which information indicating that the first lock 4 is opened and information indicating that the second lock 31 is opened are used as digital evidence in a transaction involving the transfer of the item 50.

The computer of the transaction management system 1 registers the information indicating that the first lock opening privilege and the second lock opening privilege are given to the first person first (step S11). For example, as described with reference to of FIG. 10(*a*), the second person, who is a transaction user of the transaction management system 1, logs in to the transaction management system 1 by using a terminal or the like and registers the information indicating that the first lock opening privilege is given to the first person. In addition, as described with reference to FIG. 10(*b*), the second person or the courier logs in to the transaction management system 1 by using a terminal or the like and registers the information indicating that the second lock opening privilege is given to the first person. In this manner, by performing management to register information indicating that the first lock opening privilege and the second lock opening privilege are given to the first person, the first person is allowed to open the second lock 31 attached to the item storage unit 3 and pick up the item 50 from the item storage unit 3 and is allowed to open the first lock 4 attached to the item 50 and remove the first lock 4 from the item 50.

Subsequently, the computer of the transaction management system 1 determines whether the second lock 31 has been opened (step S12). As described with reference to FIG. 10(*c*), for example, the computer of the transaction management system 1 determines whether the first person has opened the second lock 31 of the item storage unit 3 by using, for example, a terminal. Upon receiving a request for opening the second lock 31 from the first person, the item storage unit 3 inquires of the computer of the transaction management system 1, that is, the server apparatus 2 as to whether the first person, who is a transaction user, has the second lock opening privilege. If the first person has the second lock opening privilege, the item storage unit 3 opens the second lock 31.

If, in step S12, it is determined that the second lock 31 has been opened (Yes in step S12), the computer of the transaction management system 1 performs management tasks on the basis that the first transaction in which the item 50 is tentatively received is concluded (step S13). More specifically, when the computer of the transaction management system 1 acquires, from the item storage unit 3, the information indicating that the second lock 31 of the item storage unit 3 having the item 50 stored therein is opened, the computer of the transaction management system 1 performs management tasks on the basis that the first transaction is concluded in which the first person tentatively receives the item 50 from the second person. According to the present embodiment, the transaction management system 1 performs management tasks on the basis that the first transaction is concluded if the information indicating that the second lock 31 is opened is recorded in the ledger 211.

Subsequently, the computer of the transaction management system 1 determines whether the first lock 4 has been opened (step S14). As described with reference to FIG. 10(*d*), for example, the computer of the transaction management system 1 determines whether the first person has opened the first lock 4 attached to the item 50 by using a terminal or the like. Note that, upon receiving from a lock opening request from the first person, the first lock 4 inquires of the computer of the transaction management system 1, that is, the server apparatus 2 as to whether the first lock opening privilege is given to the first person, who is the transaction user. If the first lock opening privilege is given to the first person, the first lock 4 is opened.

If, in step S14, it is determined that the first lock 4 has been opened (Yes in step S14), the computer of the transaction management system 1 performs management tasks on the basis that a second transaction in which the item 50 is finally received is concluded (step S15). More specifically, upon receiving, from the first lock 4, the information indicating that the first lock 4 has been opened, the computer of the transaction management system 1 performs management tasks on the basis that the second transaction in which the first person inspects the item 50 and, thereafter, finally receives the item 50 is concluded. Note that according to the present embodiment, the transaction management system 1 performs management tasks on the basis that the second transaction is concluded if the information indicating that the first lock 4 is opened is recorded in the ledger 211.

The operation performed by the transaction management system 1 according to the present embodiment is described in detail below.

Figure 13:
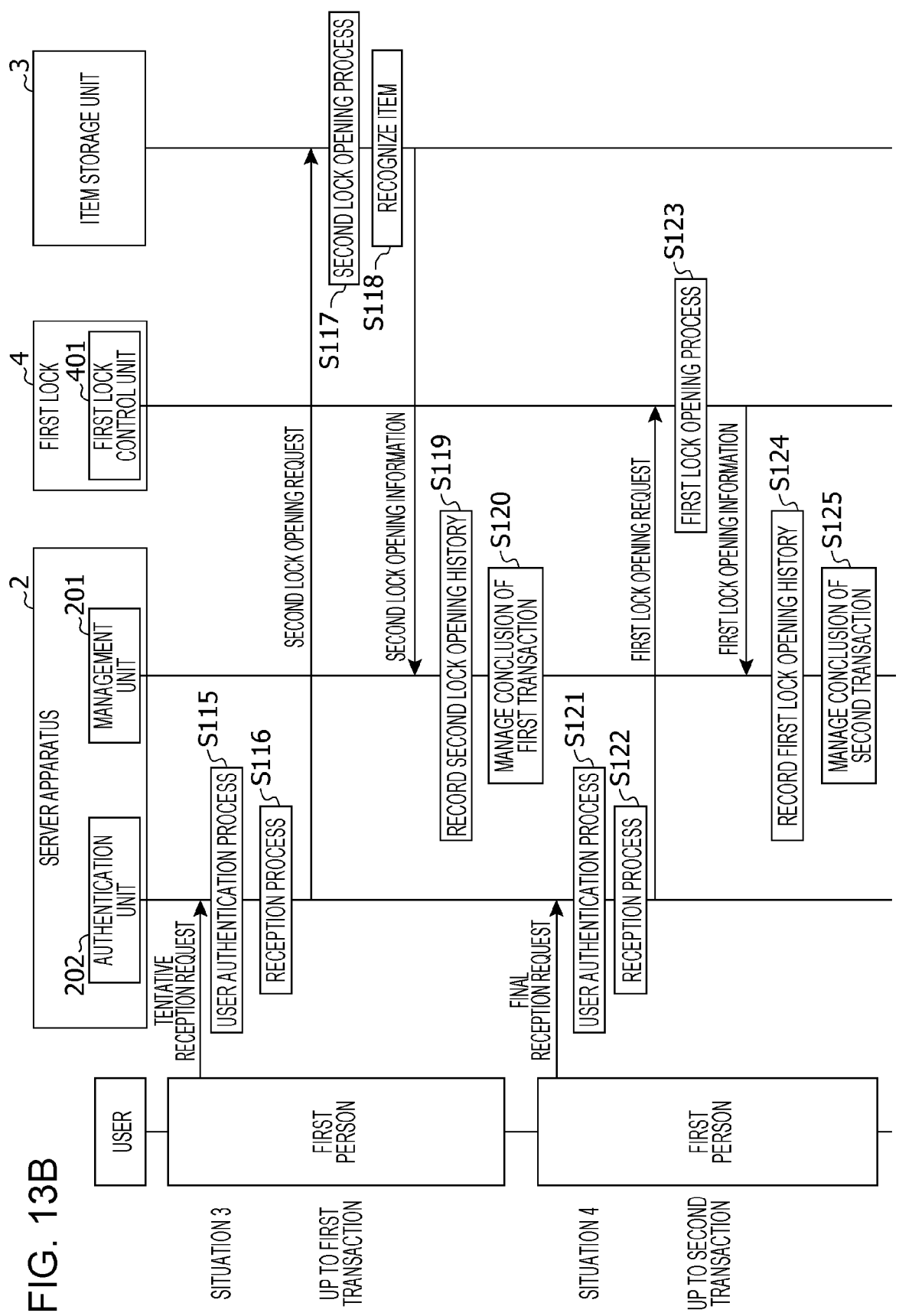
FIG. 13A is a sequence diagram illustrating an example of the operation performed by the transaction management system according to the embodiment.
FIG. 13B is a sequence diagram illustrating an example of the operation performed by the transaction management system according to the embodiment.

FIGS. 13A and 13B are sequence diagrams illustrating an example of the operation performed by the transaction management system 1 according to the present embodiment. FIG. 13A illustrates Situation 1 and Situation 2. Situation 1 describes a shipment process in which the second person prepares to ship the item 50 to the first person. Situation 2 describes a delivery process in which the courier or the second person delivers the item 50 to the item storage unit 3 located at a predetermined place, stores the item 50 in the item storage unit 3, and closes the second lock 31. FIG. 13B illustrates Situation 3 and Situation 4. Situation 3 ends when the first transaction is concluded in which the first person tentatively receives the item 50 in the item storage unit 3. Situation 4 ends when the second transaction is concluded in which the first person removes, from the item 50, the first lock 4 attached to the item 50 and finally receives the item 50.

Situation 1 is described first.

When transfer of the item 50 is agreed between the second person and the first person, the second person performs the shipment process of the item 50. More specifically, after attaching the first lock 4 to the item 50, the second person logs in to the transaction management system 1 by using a terminal or the like and sends a shipment process request.

Then, the authentication unit 202 of the transaction management system 1 performs a user authentication process to verify whether the second person is an authorized transaction user (step S101). If, in step S101, it is determined that the second person is an authorized transaction user, the authentication unit 202 performs a reception process to receive the shipment process request (step S102). Subsequently, the authentication unit 202 sends the shipment process request to the management unit 201.

Subsequently, upon receiving the shipment process request, the management unit 201 sends a first lock opening request to the first lock 4. In addition, the management unit 201 performs an item information registration process to register, in the ledger 211, the item information about the item 50 input by the second person via the terminal (step S103). For example, the item information about the item 50 includes information indicating that the item 50 is the electronic gear A and information indicating that the item identification information of the item 50 is the identifier of the first lock 4.

Subsequently, upon receiving the first lock opening request, the first lock control unit 401 of the first lock 4 inquires of the server apparatus 2 as to whether the first lock opening privilege for the first lock 4 is given to the second person who is the transaction user. If the first lock opening privilege is given to the second person, the first lock control unit 401 performs a first lock closing process to close the first lock 4 (step S104). After performing the first lock closing process, the first lock control unit 401 of the first lock 4 sends, to the management unit 201, first lock closing information indicating that the first lock 4 is closed. Note that the order of steps S103 and S104 may be reversed without any problem. While the following description is given with reference to the item 50 identified by using the identifier of the first lock 4, the technique for identifying the item 50 is not limited thereto. For example, the identifier of the item 50 itself may be used to identify the item 50. In this case, information indicating the identifier of the item 50 is recorded in the item identification information about the item 50.

Subsequently, upon receiving the first lock closing information, the management unit 201 records, in the ledger 211, the first lock closing history indicating that the first lock 4 is closed (step S105). Subsequently, in response to an operational input from the second person via a terminal, the management unit 201 records, in the ledger 211, the information indicating that the first lock opening privilege is given to the first person and the information indicating that the second lock opening privilege is given to the second person or the courier. In this manner, the management unit 201 registers the lock opening privilege (step S106). Subsequently, the management unit 201 generates item shipment notification information indicating that the second person has finished preparation to ship the item 50 and has executed a transaction for performing the procedure for shipment of the item 50 (step S107) and sends the item shipment notification information to the first person. Note that the management unit 201 may further send the generated item shipment notification information to a system used by the courier.

Situation 2 is described below.

The courier or the second person performs the delivery process of the item 50. More specifically, the courier or the second person delivers the item 50 having the closed first lock 4 attached thereto to the item storage unit 3 first. Subsequently, the second person or the courier stores, in the item storage unit 3, the delivered item 50 having the first lock 4 attached thereto. Thereafter, the courier or the second person logs in to the transaction management system 1 by using the terminal or the like and sends a delivery process request.

Then, the authentication unit 202 of the transaction management system 1 performs a user authentication process to verify whether the courier or the second person is an authorized transaction user (step S108). If, in step S108, it is determined that the courier or the second person is an authorized transaction user, the authentication unit 202 performs a reception process to receive the delivery process request (step S109). Subsequently, the authentication unit 202 sends a second lock opening request to the item storage unit 3.

Subsequently, upon receiving the second lock opening request, the item storage unit 3 performs item recognition to recognize whether the item is stored in the item storage unit 3 first (step S110). Subsequently, the item storage unit 3 inquires of the server apparatus 2 as to whether the second lock opening privilege is given to the courier or the second person, who is the transaction user. If the second lock opening privilege is given to the courier or the second person, the item storage unit 3 performs a second lock closing process to close the second lock 31 (step S111). After performing the second lock closing process, the item storage unit 3 sends, to the management unit 201, the second lock closing information indicating that the second lock 31 is closed.

Subsequently, upon receiving the second lock closing information, the management unit 201 records, in the ledger 211, the second lock closing history indicating that the second lock 31 is closed (step S112). Subsequently, in response to an operational input from the second person via the terminal, the management unit 201 records, in the ledger 211, information indicating that the second lock opening privilege is given to the first person. In this manner, the management unit 201 registers information indicating transfer of the second lock opening privilege (step S113). Subsequently, the management unit 201 generates item delivery notification information indicating that the courier or the second person has completed the delivery of the item 50 and that the item 50 is stored in the item storage unit 3 (step S114). Thereafter, the management unit 201 sends the item delivery notification information to the first person.

Situation 3 is described below.

The first person performs the first transaction in which the first person opens the second lock 31 of the item storage unit 3 having the item 50 stored therein and tentatively receives the item 50. More specifically, the first person moves to the place where the item storage unit 3 is installed first. Thereafter, the first person logs in to the transaction management system 1 by using a terminal or the like and sends the tentative reception request.

Then, the authentication unit 202 of the transaction management system 1 performs a user authentication process to verify whether the first person is an authorized transaction user (step S115). If, in step S115, it is determined that the first person is an authorized transaction user, the authentication unit 202 performs a reception process to receive the tentative reception request (step S116). Subsequently, the authentication unit 202 sends the second lock opening request to the item storage unit 3.

Subsequently, upon receiving the second lock opening request, the item storage unit 3 inquires of the server apparatus 2 as to whether the second lock opening privilege is given to the first person who is a transaction user first. If the second lock opening privilege is given to the first person, the item storage unit 3 performs a second lock opening process to open the second lock 31 (step S117). As a result, the first person can pick up the item 50 having the closed first lock 4 attached thereto from the item storage unit 3 and tentatively receive the item 50. Subsequently, after performing the second lock opening process, the item storage unit 3 performs item recognition to recognize whether the item is stored in the item storage unit 3 (step S118). If, in step S118, it is recognized that no item is stored in the item storage unit 3, the item storage unit 3 sends, to the management unit 201, second lock opening information indicating that the second lock 31 is opened.

Subsequently, upon receiving the second lock opening information, the management unit 201 records, in the ledger 211, the second lock opening history indicating that the second lock 31 is opened (step S119) and performs management tasks on the basis that the first transaction is concluded (step S120).

Finally, Situation 4 is described below.

If the first person inspects the tentatively received item 50 and determines that the item 50 is an acceptable item, the first person executes a second transaction in which the first person opens the first lock 4 attached to the item 50 and finally receives the item 50. More specifically, if the first person inspects the item 50 and determines that the item 50 is an acceptable item, the first person logs in to the transaction management system 1 by using a terminal or the like and sends the final reception request.

Then, the authentication unit 202 of the transaction management system 1 performs a user authentication process to verify whether the first person is an authorized transaction user (step S121). If, in step S121, it is verified that the first person is an authorized transaction user, the authentication unit 202 performs the reception process to receive the final reception request (step S122). Subsequently, the authentication unit 202 sends a first lock opening request to the first lock 4.

Subsequently, upon receiving the first lock opening request, the first lock control unit 401 of the first lock 4 inquires of the server apparatus 2 as to whether the first lock opening privilege is given to the first person who is the transaction user. If the first lock opening privilege is given to the first person, the first lock control unit 401 performs a first lock opening process to open the first lock 4 (step S123). After performing the first lock opening process, the first lock control unit 401 of the first lock 4 sends, to the management unit 201, first lock opening information indicating that the first lock 4 is opened. As a result, the first person can open and remove the first lock 4 attached to the item 50 and finally receive the item 50. That is, the first person can be an owner of the item 50.

Subsequently, upon receiving the first lock opening information, the management unit 201 records, in the ledger 211, a first lock opening history indicating that the first lock 4 is opened (step S124). Thus, the management unit 201 performs management tasks on the basis that the second transaction is concluded (step S125).

Effects

As described above, the transaction management system 1 according to the present embodiment can prevent the first person, who is the recipient of the item 50, from receiving the item 50 that is unacceptable by using, as the transaction history of transfer of the item 50, the open/close history of the first lock 4 and the second lock 31 opened and closed through an electronic process. In addition, even when the first person has received the item 50 that is unacceptable, the first person can ship back the item 50 or request for a replacement process to the second person who has delivered the item 50 in an appropriate manner, since the transaction history of the transfer of the item 50 fully remains as digital evidence. That is, according to the present embodiment, the transaction management system 1 can provide a more reliable transaction involving the transfer of the item 50 without face-to-face contact. As a result, a fraud item 50 and a fraud transaction can be prevented. Thus, the number of fraud items 50 can be reduced, and energy consumption required for return or replacement of the item can be reduced. In this manner, energy saving can be achieved.

Furthermore, the transaction management system 1 and the like according to the present embodiment records and accumulates, in the ledger 211, the open/close history of the first lock 4 and the second lock 31 that are opened and closed through an electronic process. As a result, according to the present embodiment, the transaction management system 1 or the like can more reliably execute a transaction involving transfer of a proper item 50 without face-to-face contact.

First Modification

While the above embodiment has been described with reference to a single ledger 211 for convenience of description, the number of the ledgers 211 is not limited thereto. The ledger 211 may be a distributed ledger consisting of a plurality of ledgers 211 having the same information or a blockchain-based distributed ledger including a plurality of ledgers having the same information. The case in which a plurality of ledgers 211 are used is described below as a first modification. Note that differences between the first modification and the above-described embodiment are mainly described below.

Server Apparatus

Figure 14:
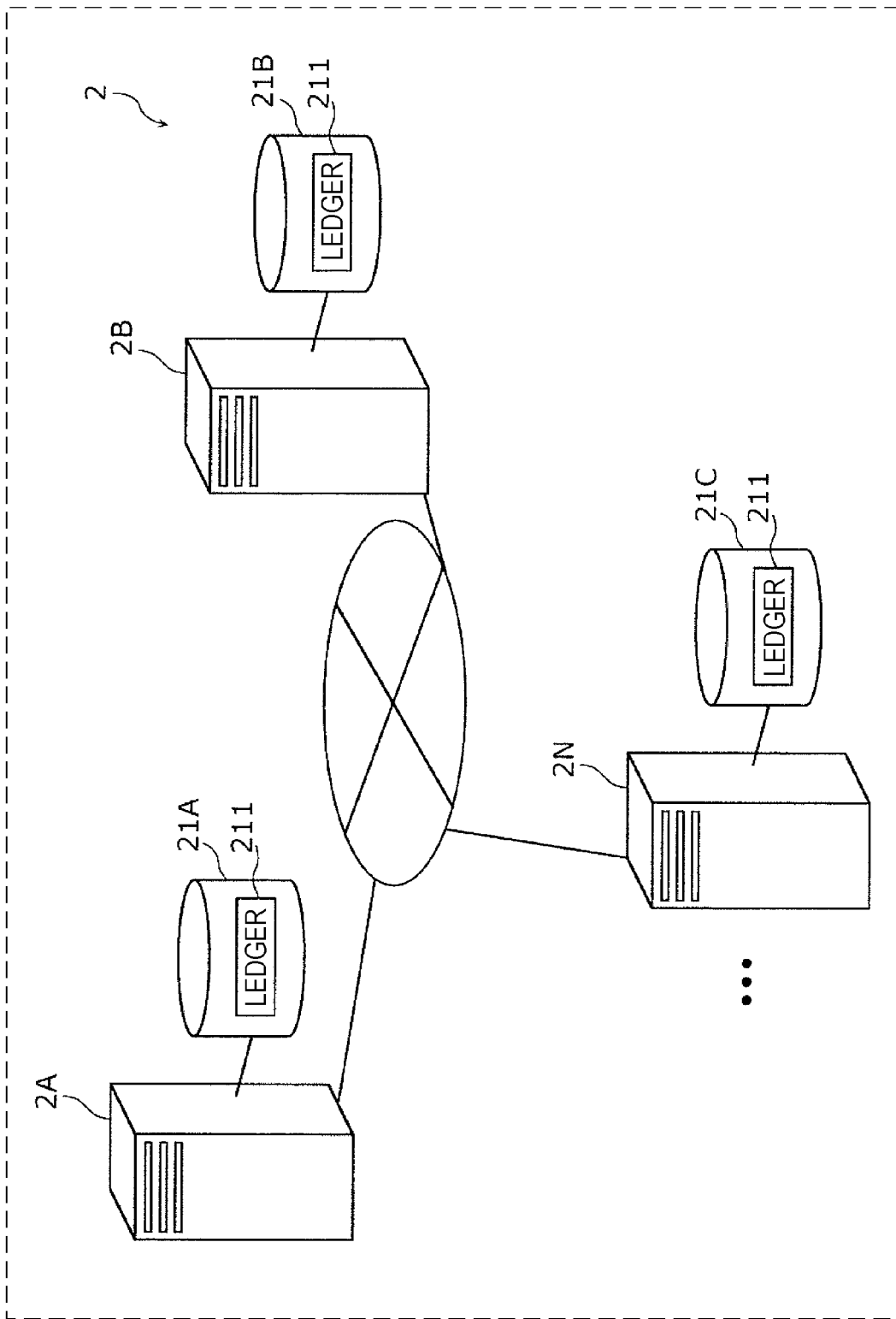
FIG. 14 is a diagram illustrating an example of a configuration of a server apparatus according to a first modification.

FIG. 14 is a diagram illustrating an example of the configuration of server apparatuses 2 according to a first modification. The same reference numerals are used in FIG. 14 to describe those constituent elements that are identical to the constituent elements of FIG. 1 and other figures, and detailed description of the constituent elements is not repeated.

The server apparatuses 2 illustrated in FIG. 14 include server apparatuses 2A, 2B, . . . , 2N. The server apparatuses 2A, 2B, . . . , 2N are connected to one another via a network 5 and are connected to storage devices 21A, 21B, . . . , 21N, respectively. Each of the storage devices 21A, 21B, . . . , 21N includes a ledger 211 having the same information.

According to the present modification, suppose that the management unit 201 of one of the plurality of server apparatuses 2A, 2B, . . . , 2N records information on the ledger 211 in the storage device connected to the server apparatus. In this case, the management units 201 of all of the other server apparatuses also write information the same as the information recorded in the ledger 211 in the storage device to the ledgers 211 in the storage devices 21A, 21B, . . . , 21N. Note that each of the ledgers 211 may be formed on the basis of the blockchain technology.

The configuration of each of the server apparatuses 2A, 2B, . . . , 2N is the same as that described in the above embodiment with reference to FIGS. 2 to 4, and description of the configuration is not repeated. Each of the server apparatuses 2A, 2B, . . . , 2N may be formed by a personal computer or may be formed by a cloud server.

Effects

As described above, according to the present modification, the management unit 201 of the transaction management system 1 accumulates, in the distributed blockchain-based ledgers 211 having the same information, the open/close history of the first lock 4 and the second lock 31 that is opened and closed through an electronic process. Thus, the transaction management system 1 can reliably manage the first transaction and the second transaction, which are transactions involving the transfer of the item 50, on the basis of digital evidence. Since as described above, the open/close histories of the first lock 4 and the second lock 31 are accumulated in the distributed ledgers 211, the tamper resistance of the open/close history of the first lock 4 and the second lock 31 can be improved. Thus, the reliability is improved in terms of the digital evidence recorded in the ledger 211 and indicating conclusion of the first transaction and the second transaction involving the transfer of the item 50. As a result, a transaction involving the transfer of a proper item can be more reliably executed without face-to-face contact.

Second Modification

While the above embodiment and first modification have been described with reference to the first person who is the recipient of the item 50 and opens the second lock 31 of the item storage unit 3 and the first lock 4 attached to the item 50 by using the transaction management system 1, the technique of opening the locks is not limited thereto. The first person may open the second lock 31 of the item storage unit 3 and the first lock 4 attached to the item 50 by using the near field communication technology, that is, by touching or bringing a mobile terminal carried by the first person and each of the second lock 31 and the first lock 4 into close proximity. This case is described below as the second modification. Note that differences between the second modification and each of the above-described embodiment and first modification are mainly described below.

Mobile Terminal

The mobile terminal includes a processor and a memory. The mobile terminal is capable of performing near field communication with the second lock 31 attached to the item storage unit 3 and the first lock 4 attached to the item 50. Examples of a mobile terminal include a tablet and a smartphone.

The mobile terminal can send the second lock opening request to the second lock 31 of the item storage unit 3 and send the first lock opening request to the first lock 4 attached to the item 50 through the operation performed on the mobile terminal by the first person. According to the present modification, when the first person touches or brings the mobile terminal and the second lock 31 into close proximity, the mobile terminal sends the second lock opening request to the item storage unit 3. In addition, the mobile terminal sends, to the item storage unit 3, information indicating that a transaction user who sends the second lock opening request is the first person. Upon receiving the information, the item storage unit 3 communicates with the transaction management system 1, that is, the server apparatus 2, and determines whether the first person, who is the transaction user and has sent the second lock opening request, has the second lock opening privilege. If the first person has the second lock opening privilege, the first person can open the second lock 31. That is, in response to the second lock opening request, the mobile terminal can cause the item storage unit 3 to open the second lock 31. In addition, when the first person touches or brings the mobile terminal and the first lock 4 into close proximity, the mobile terminal sends the first lock opening request to the first lock 4. Furthermore, the mobile terminal sends, to the first lock 4, the information indicating that the transaction user who has sent the first lock opening request is the first person. Upon receiving the information, the first lock 4 communicates with the transaction management system 1, that is, the server apparatus 2, and determines whether the first user, who is the transaction user and has sent the first lock opening request, has the first lock opening privilege. If the first person has the first lock opening privilege, the first person can open the first lock 4. That is, in response to the first lock opening request, the mobile terminal can cause the first lock 4 to open. In this manner, the mobile terminal can open the first lock 4 when the first person touches or brings the mobile terminal and the first lock 4 into close proximity. In addition, the mobile terminal can open the second lock 31 when the first person touches or brings the mobile terminal and the second lock 31 into close proximity.

Example

According to the present example, a description is given of a transaction involving the transfer of the item 50 executed between the first person and the second person being a sales transaction executed between individuals. Note that differences between the embodiment and each of the above-described embodiment and the first modification are mainly described below.

Figure 15:
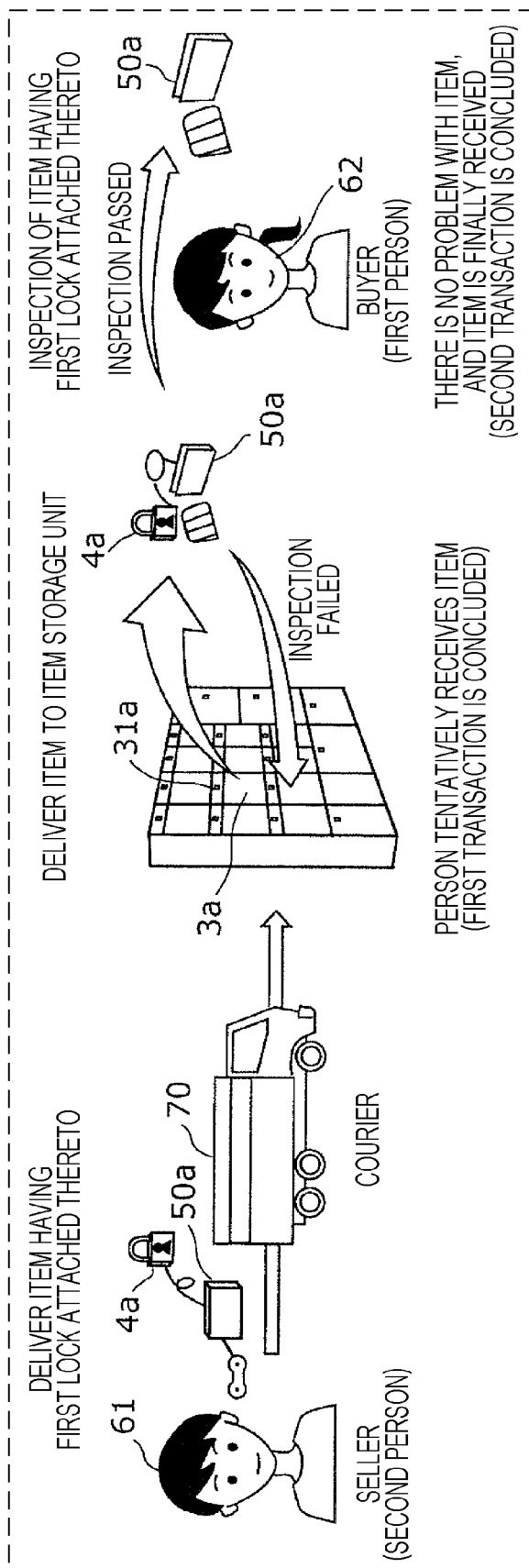
FIG. 15 is a schematic diagram illustrating the outline of a transaction involving transfer of an item according to an example.

FIG. 15 is a schematic diagram illustrating the outline of a transaction involving the transfer of the item 50 according to the example. In FIG. 15, a seller 61 corresponds to the above-mentioned second person, a buyer 62 corresponds to the above-mentioned first person, the item 50a, such as an electronic gear, corresponds to the above-mentioned item 50 offered by the above-mentioned second person. In addition, the following description is given on the assumption that an item storage unit 3a is one of the delivery lockers located at a distance that the first person who is a buyer can easily go receive the item 50.

First, let us assume that the seller 61 and the buyer 62 agree to a contract for the sale of the item 50a. That is, the buyer 62 wants to purchase the item 50a that the seller 61 listed for sale and sends a purchase request to the transaction management system 1. Thereafter, the buyer 62 temporarily deposits the payment amount into an account held by the transaction management system 1 by using electronic technology, such as payment by a credit card or a bank transfer. Then, the seller 61 attaches a first lock 4a to the item 50a, closes the first lock 4a and, thereafter, performs a shipping process to have a courier 70 deliver the item 50a. Thereafter, the seller 61 registers that information in the transaction management system 1.

Subsequently, the courier 70 delivers, to the item storage unit 3, the item 50a having the closed first lock 4a attached thereto and stores the item 50a in the item storage unit 3a. Subsequently, the courier 70 uses the transaction management system 1 to close a second lock 31a.

Subsequently, the buyer 62 moves to the item storage unit 3a and uses the transaction management system 1 to open the second lock 31a of the item storage unit 3a and executes a first transaction to tentatively receive the item 50a. As a result, the buyer 62 brings the item 50a to a predetermined place, such as home, and can inspect whether the item 50a operates normally. That is, the buyer 62 can determine whether the item 50*a* is acceptable by inspecting the operation performed by the item 50*a* with the first lock 4*a* attached thereto.

Subsequently, after determining that the item 50*a* at hand operates normally and is acceptable and, therefore, there is no problem with the item 50*a*, the buyer 62 uses the transaction management system 1 and execute a transaction to open the first lock 4*a* attached to the item 50*a*. In this manner, the buyer 62 can open the first lock 4*a* attached to the item 50*a* and remove the first lock 4*a*. Thus, the buyer 62 can finally receive the item 50*a*. At this time, the transaction management system 1 performs a transaction to remit the tentatively deposited payment of the buyer 62 to the seller 61. In this way, the sales transaction between the seller 61 and the buyer 62 involving the transfer of the item 50*a* can be securely and reliably executed.

The operation performed by the transaction management system 1 according to the present example is described in detail below.

Figure 16A:
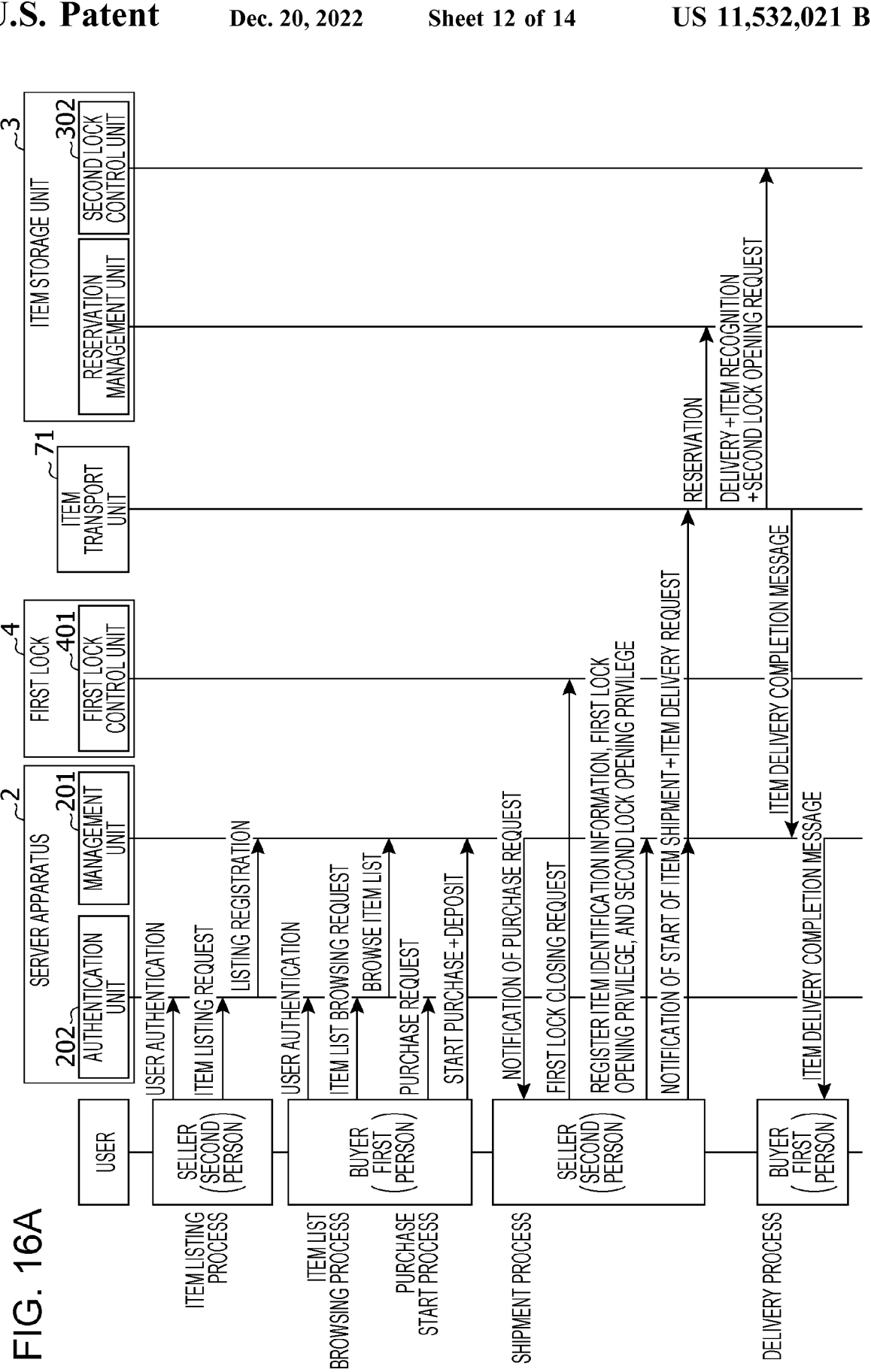
FIG. 16A is a sequence diagram illustrating an example of the operation performed by the transaction management system according to the example.
Figure 17:
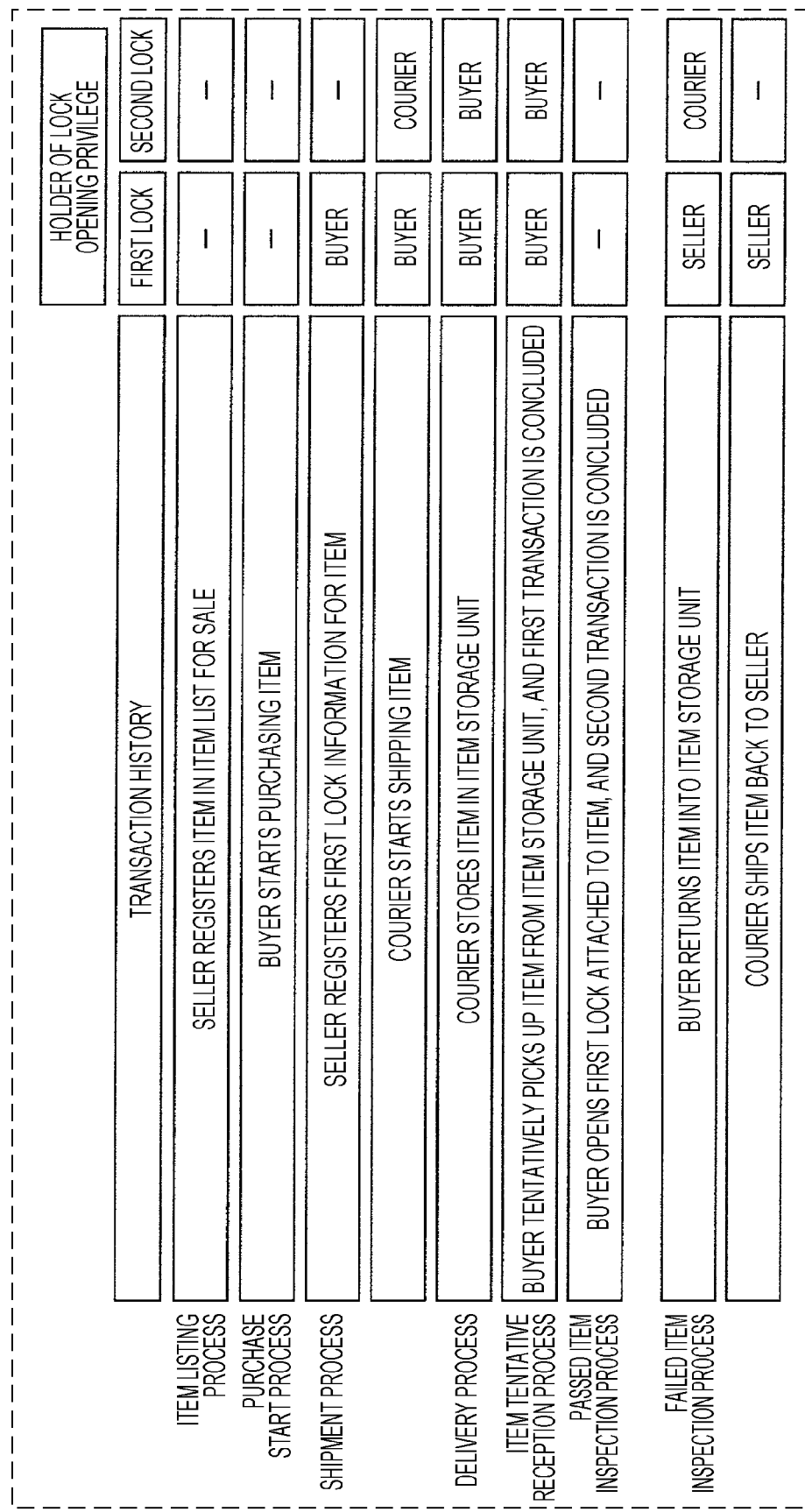
FIG. 17 is a diagram illustrating an example of a transaction history and a lock opening privilege holder according to the example.

FIGS. 16A and 16B are sequence diagrams illustrating an example of the operation performed by the transaction management system 1 according to the present example. FIG. 17 is a diagram illustrating an example of a transaction history and lock opening privilege holders according to the present example. The following description is given on the assumption that the transaction management system 1 further records, in the ledger 211, transactions other than the unlocking of the first lock 4*a* and the second lock 31*a* as a transaction history.

The item listing process performed by the seller 61 (the second person) illustrated in FIG. 16A is described first.

The seller 61 puts the item 50*a* on a sales item list that can be browsed on the web managed by the server apparatus 2. That is, the seller 61 logs in to the server apparatus 2 and sends a listing request to register the item 50*a* in the sales item list. At this time, the authentication unit 202 of the server apparatus 2 performs a user authentication process to verify whether the seller 61 is an authorized transaction user first. If the seller 61 is an authorized transaction user, the server apparatus 2 performs the reception process to receive the listing request. Subsequently, the management unit 201 of the server apparatus 2 performs a listing registration process to register the item 50*a* notified by the seller 61 in the sales item list. As illustrated in FIG. 17, the management unit 201 records, in the ledger 211, the information indicating that the seller 61 has registered the item 50*a* in the sales item list. At this time, the item information about the item 50*a* is further registered in the sales item list.

An item list browsing process and a purchase start process performed by the buyer 62 (the first person) illustrated in FIG. 16A are described below.

The buyer 62 logs in to the server apparatus 2 and sends a sales item list browsing request to browse the sales item list managed by the server apparatus 2 first. Then, the authentication unit 202 of the server apparatus 2 performs a user authentication process to verify whether the buyer 62 is an authorized transaction user first. If the buyer 62 is an authorized transaction user, the authentication unit 202 performs the reception process to receive the sales item list browsing request. Subsequently, in response to the sales item list browsing request, the management unit 201 of the server apparatus 2 permits the buyer 62 to browse the sales item list. As a result, the buyer 62 can browse the sales item list managed by the transaction management system 1.

At this time, suppose that the buyer 62 wishes to purchase the item 50*a* that the seller 61 put on the sales item list. In this case, the buyer 62 sends, to the server apparatus 2, a purchase request to purchase the item 50*a* and temporarily deposits the payment amount into an account held by the server apparatus 2 by using electronic technology, such as payment by a credit card or a bank transfer. The payment amount is an amount needed for purchase the item 50*a* and may include delivery charges. Thereafter, the server apparatus 2 records, in the ledger 211, a transaction history indicating that the buyer 62 has started purchasing the item 50*a*, as illustrated in FIG. 17.

The shipment process performed by the seller 61 (the second person) illustrated in FIG. 16A is described below.

Upon receiving a notification of the purchase request of the item 50*a* from the transaction management system 1, the seller 61 performs a shipment process by using the transaction management system 1. That is, upon receiving the notification of the purchase request of the item 50*a* from the server apparatus 2, the seller 61 attaches the first lock 4*a* to the item 50*a* first. Thereafter, by using a terminal or the like, the seller 61 logs in to the server apparatus 2 and registers the item identification information about the item 50*a*, the first lock opening privilege, and the second lock opening privilege. Thereafter, the seller 61 sends the first lock opening request to the first lock 4. At this time, as illustrated in FIG. 17, the server apparatus 2 records, in the ledger 211, a transaction history indicating that the seller 61 has registered the first lock opening privilege of the first lock 4*a* attached to the item 50*a*. Upon receiving the first lock opening request, the first lock 4 inquires of the server apparatus 2 as to whether the first lock opening privilege is given to the seller 61 (that is, the transaction user). If the first lock opening privilege is given to the seller 61, the first lock 4 is closed. Note that the server apparatus 2 may record, in the ledger 211, the information indicating that the first lock 4*a* attached to the item 50*a* is closed as the transaction history.

Subsequently, the seller 61 logs in to the server apparatus 2, generates an item shipment start notification indicating that a transaction for performing the procedure for shipping the item 50*a* is executed and sends an item delivery request in order to deliver the item 50*a* to the item storage unit 3*a*. As illustrated in FIG. 17, in response to the item delivery request, the server apparatus 2 records, in the ledger 211, a transaction history indicating that the seller 61 has started shipping the item 50*a*. In addition, the server apparatus 2 outputs the item delivery request to, for example, an item transport unit 71 of a system used by the courier 70. As a result, a transaction that causes the courier 70 to deliver the item 50*a* to the item storage unit 3*a* can be executed. Note that the item shipment start notification may function as the item delivery request.

The delivery process performed by the courier 70 illustrated in FIG. 16A is described below.

Upon receiving the item delivery request from the item transport unit 71, the courier 70 accesses a reservation management unit of an item storage unit 3*a* which is one of the item storage units 3 that are empty and makes a reservation first. Thereafter, the courier 70 delivers the item 50*a* having the closed first lock 4*a* attached thereto to the item storage unit 3*a*. Subsequently, the courier 70 stores, in the item storage unit 3*a*, the item 50*a* having the closed first lock 4*a* attached thereto. Thereafter, the courier 70 logs in to the server apparatus 2 by using a terminal or the like and sends a second lock closing request to close the second lock 31 attached to the item storage unit 3*a*. At this time, the item storage unit 3 performs item recognition to recognize whether the item is stored in the item storage unit 3. If the item is stored in the item storage unit 3, the item storage unit 3 determines whether the second lock opening privilege is given to the courier 70. If the second lock opening privilege is given to the courier 70, the item storage unit 3a performs the second lock closing process to close the second lock 31a. After confirming that the second lock 31a of the item storage unit 3a is closed, the courier 70 registers an item delivery completion notification in the server apparatus 2 via the item transport unit 71. When the item delivery completion notification is registered, the server apparatus 2 sends, to the buyer 62, the item delivery completion notification indicating that the item 50a has been delivered into the item storage unit 3a. In addition, the server apparatus 2 makes registration of transfer of the second lock opening privilege to the buyer 62. Note that upon receiving, from the item storage unit 3a, the second lock closing information indicating that the second lock 31a has been closed together with the item delivery completion notification, the server apparatus 2 may make registration of the item delivery completion notification and the transfer of the second lock opening privilege. Alternatively, upon receiving the second lock closing information, the server apparatus 2 may make registration of the item delivery completion notification and the transfer of the second lock opening privilege. In addition, the server apparatus 2 sends the item delivery completion notification and the like and records, in the ledger 211, a transaction history indicating that the courier 70 has stored the item 50a in the item storage unit 3a, as illustrated in FIG. 17. Furthermore, the server apparatus 2 makes registration of transfer of the second lock opening privilege to the buyer 62.

The item tentative reception process performed by the buyer 62 (the first person) illustrated in FIG. 16B is described below. In the item tentative reception process, the buyer 62 tentatively receives the item.

The buyer 62 moves to the place where the item storage unit 3a is installed first, logs in to the server apparatus 2, and sends a tentative reception request relating to the item 50a. Then, the authentication unit 202 of the server apparatus 2 performs a user authentication process to verify whether the buyer 62 is an authorized transaction user first. If the buyer 62 is an authorized transaction user, the server apparatus 2 sends the second lock opening request to the item storage unit 3a. Upon receiving the second lock opening request, the item storage unit 3a inquires of the server apparatus 2 as to whether the second lock opening privilege is given to the buyer 62 first. If the second lock opening privilege is given to the buyer 62, the item storage unit 3a performs the second lock opening process to open the second lock 31a. As a result, the buyer 62 can pick up the item 50a having the closed first lock 4a attached thereto from the item storage unit 3a and tentatively receive the item 50a. Subsequently, after performing the second lock opening process, the item storage unit 3a performs item recognition to recognize whether the item is stored in the item storage unit 3a. Upon recognizing that any item is not stored, the item storage unit 3a sends, to the server apparatus 2, the second lock opening information indicating that the second lock 31a is opened. As illustrated in FIG. 17, upon receiving the second lock opening information, the server apparatus 2 records, the ledger 211, a transaction history indicating that the buyer 62 tentatively received the item 50a stored in the item storage unit 3a and that the first transaction is concluded.

A passed item inspection process performed by the buyer 62 (the first person) illustrated in FIG. 16B is described below.

If the first person inspects the item 50a and determines that the item 50a operates normally and, thus, is an acceptable item, the buyer 62 logs in to the server apparatus 2 by using a terminal or the like and sends an acceptable item notification. The acceptable item notification corresponds to the final reception request described in the above example. Then, the authentication unit 202 of the server apparatus 2 verifies whether the buyer 62 is an authorized transaction user. If the buyer 62 is an authorized transaction user, the server apparatus 2 sends the first lock opening request to the first lock 4a. Upon receiving the first lock opening request, the first lock 4a inquires of to the server apparatus 2 as to whether the first lock opening privilege is given to the buyer 62 first. If the first lock opening privilege is given to the buyer 62, the first lock 4a performs the first lock opening process to open the first lock 4a. After performing the first lock opening process, the first lock 4a sends, to the server apparatus 2, the first lock opening information indicating that the first lock 4a is opened. As a result, the buyer 62 can open the first lock 4a attached to the item 50a and remove the first lock 4a. Thus, the buyer 62 can finally receive the item 50a. At this time, as illustrated in FIG. 17, upon receiving the first lock opening information, the server apparatus 2 records, in the ledger 211, the transaction history indicating that the buyer 62 opens the first lock 4a attached to the item 50a and the second transaction is concluded. In addition, the server apparatus 2 remits the tentatively deposited payment of the buyer 62 to the seller 61.

Note that the buyer 62 may touch or bring the mobile terminal of their own and each of the first lock 4a and the second lock 31a of the item storage unit 3a into close proximity to open the first lock 4a and the second lock 31a of the item storage unit 3a. In this case, the buyer 62 can log in to the server apparatus 2 and cause the mobile terminal to obtain information identifying the registered buyer 62 itself before going to the place where the item storage unit 3a is installed. By touching or bringing the mobile terminal and each of the first lock 4a and the second lock 31a of the item storage unit 3a into close proximity, the buyer 62 can send the information identifying the buyer 62 itself and one of the first lock opening request and the second lock opening request via near field communication.

A failed item inspection process performed by the buyer 62 (the first person) illustrated in FIG. 16B is described below.

If the item 50a does not operate normally or the item 50a is unacceptable (e.g., the item 50a differs from that the buyer 62 requested to buy (ordered)), the buyer 62 returns the item 50a into the item storage unit 3a. Thereafter, the buyer 62 log in to the server apparatus 2 by using the terminal and sends an unacceptable item notification. In response to the unacceptable item notification, the authentication unit 202 of the server apparatus 2 verifies whether the buyer 62 is an authorized transaction user. If the buyer 62 is an authorized transaction user, the server apparatus 2 sends the second lock closing request to the item storage unit 3a. Upon receiving the second lock closing request, the item storage unit 3a performs item recognition to recognize whether the item is stored. If the item storage unit 3a recognizes that the item is stored, the item storage unit 3a performs the second lock closing process. After performing the second lock closing process, the item storage unit 3a sends, to the server apparatus 2, second lock closing information indicating that the second lock 31a is closed. Upon receiving the second lock closing information, the server apparatus 2 records, in the ledger 211, a transaction history indicating that the buyer 62 returned the item 50a into the item storage unit 3a, as illustrated in FIG. 17. In addition, the server apparatus 2 outputs a shipping-back request to, for example, an item transport unit 71 of the system used by the courier 70. In addition, the server apparatus 2 deducts the service charge, such as the cancel fee, from the deposit amount of the buyer 62 and returns the payment to the buyer 62.

Upon receiving the shipping-back request via the item transport unit 71, the courier 70 moves to the place where the item storage unit 3*a* is installed, picks up the item 50*a* from the item storage unit 3*a*, and ships back the item 50*a* to the seller 61. Upon receiving, from the item transport unit 71, a notification indicating that the shipping back of the item 50*a* is completed, the server apparatus 2 records, in the ledger 211, a transaction history indicating that the courier 70 has returned the item 50*a* to the seller 61 and remits the service charge, such as a cancel fee, to the seller 61.

In this way, by sending and receiving the item 50*a* having the first lock 4*a* attached thereto between the seller 61 and the buyer 62, a proper item can be sent from the seller 61 to the buyer 62 even through the courier 70. That is, a transaction involving the transfer of the item 50*a* between the seller 61 and the buyer 62 can be securely and reliably executed.

Note that when, in the failed item inspection process performed by the buyer 62, the buyer 62 returns the item 50*a* into the item storage unit 3*a*, the item storage unit 3*a* may further determine whether the first lock 4*a* is attached to the item 50*a*.

For example, the item storage unit 3*a* may determine that the first lock 4*a* is not open by communicating with the first lock 4*a*. Furthermore, the first lock 4*a* may be provided with a functional unit that enables the first lock 4*a* to identify the item 50*a*. As a result, fraud related to the item can be easily detected. Examples of the fraud include attaching the first lock 4*a* to another item 50*a*, attaching the first lock 4*a* to an object with false weigh labeling other than the item 50*a*, and attaching the first lock 4*a* to a broken item of the same kind as the item 50*a*.

Note that the functional unit may be any one of the above-described various sensors or an RFID reader. However, the functional unit is not limited thereto. Any functional unit that identifies the item 50*a* can be employed.

Alternatively, the functional unit may be the above-described RFID reader and may recognize whether the item 50 is stored in the item storage unit 3 by using the RFID in the failed item inspection process. More specifically, the item storage unit 3*a* may further include an RFID reader, and the first lock 4*a* or the item 50*a* may be further provided with an RFID that identifies the item 50*a*. In this case, after performing management tasks on the basis that the first transaction is concluded, the transaction management unit 2012 can perform management tasks on the basis that the second transaction is not concluded if the following information is acquired from the item storage unit 3*a* and if the first lock 4*a* is not opened, that is, information indicating that the item storage unit 3*a* reads the RFID by using the RFID reader and determines that the item 50*a* is physically stored in the item storage unit 3*a* and, in addition, the second lock 31*a* is closed.

Furthermore, for example, if a fraud item, which is not the item 50, is placed in the item storage unit 3*a* and, thereafter, the door of the item storage unit 3*a* is closed, the item storage unit 3*a* may output alarm sound and open the door. In this manner, the item storage unit 3*a* may refuse continuation of the shipping-back procedure.

In addition, in the failed item inspection process performed by the buyer 62, instead of returning the item 50*a* into the item storage unit 3*a* from which the buyer 62 tentatively received the item 50*a*, the buyer 62 may return the item 50*a* into another item storage unit 3*a*. In this manner, it is prevented that the item storage unit 3*a* is continuously used from the time of tentative reception until conclusion of the contract, that is, conclusion of the first transaction and the second transaction. As a result, the item storage unit 3*a* can be effectively used as one of delivery lockers.

Note that a change in the lock opening privilege holder illustrated in FIG. 17 may be automatically performed by a program, instead of the seller 61 or the courier 70, in accordance with the process of the transaction, such as the shipment process or the delivery process.

Effects

As described above, according to the transaction management system 1 or the like of the present example, the first person may be the buyer 62, the second person may be the seller 61, and the item 50 may be the item 50*a* offered by the second person. In this case, the transaction in which the item 50 is tentatively received can be a transaction in which the first person determines whether the item 50*a* is an item the first person wishes to purchase before deciding the purchase of the item 50*a*, and the transaction in which the item 50 is finally received can be a transaction in which the first person decides the purchase of the item 50*a*.

As described above, according to the transaction management system 1 or the like of the present embodiment, by using the open/close history of the first lock 4*a* and the second lock 31*a* that are opened and closed through electronic processing as the transaction history of the item 50*a*, the buyer 62 of the item 50*a* can be protected from receiving an improper item 50*a*. In addition, even when the buyer 62 has received an improper item, the shipping-back process or a replacement process can be appropriately performed for the seller 61 who has sold the item 50*a*, since the transaction history of the item 50*a* reliably remains as digital evidence. That is, according to the transaction management system 1 or the like of the present embodiment, a transaction involving the transfer of the item 50*a* can be executed securely and reliably without face-to-face contact. Thus, the item 50*a* that is fake or a transaction that is fake can be prevented. As a result, a fraud item 50*a* and a fraud transaction can be prevented. Thus, the number of fraud items 50*a* can be reduced, and energy consumption required for return or replacement of the item can be reduced. In this manner, energy saving can be achieved.

Note that the ledger 211 may be a distributed ledger consisting of a plurality of block-chain based ledgers having the same information. In this manner, the tamper resistance of the open/close history of the first lock 4 and the second lock 31 can be improved. Consequently, the reliability of the digital evidence recorded in the ledger 211 for conclusion of the first transaction and the second transaction (transactions involving the transfer of the item 50) is improved. As a result, the transaction involving the transfer of a proper item can be more reliably executed without face-to-face contact.

In addition, one of the functions provided by the block-chain technology is a smart contract. In a smart contract, if a trade term requirement is fulfilled, a program that defines the trade term is executed. That is, there is a one-to-one correspondence between a trade term and the execution of a program.

According to the present embodiment, since conclusion of the first transaction can be determined by opening the second lock 31, and conclusion of the second transaction can be determined by opening of the first lock 4, the sales transaction of the item can be executed by the smart contract. That is, by using the first lock 4 and the second lock 31, physical triggers that are trade terms to conclude a smart contract related to transaction of the item can be provided. Thus, smart contract is applicable by electronically detecting the physical triggers.

Note that if the buyer 62 does not return the item 50a and does not open the first lock 4a even after a predetermined period of time from the tentative reception process of the item 50a, that is, after conclusion of the first transaction, the server apparatus 2 may determine that the sales transaction of the item 50a is concluded, that is, the second transaction is concluded.

In addition, if the buyer 62 breaks open the first lock 4a without electronically opening the first lock 4a after the tentative reception process of the item 50a, that is, after conclusion of the first transaction, the server apparatus 2 may determine that the sales transaction of the item 50a is concluded, that is, the second transaction is concluded. In this case, the first lock 4a includes the lock breaking detection unit 402. As a result, the transaction management system 1 can prevent the buyer 62 from breaking open the first lock 4a, shipping back only the first lock 4a removed from the item 50a, and avoiding conclusion of the second transaction.

In addition, a mechanism for determining whether the item 50a is not broken down may be added by attaching an impact sensor to the item 50a. In this case, if the contract is not concluded, that is, if the second transaction is not concluded and the item 50a is returned, the refund amount may be set by using the information acquired from the mechanism. In this manner, in the case where although the buyer 62 carelessly breaks down the item 50a, the buyer 62 does not purchase the item 50a and ships back the item 50a and, thus, the second transaction is not concluded, the transaction management system 1 can appropriately process the case. At this time, the courier 70, as a third party, may take photos of the item at the time of delivery and at the time of shipping back the item 50a to increase the admissibility of evidence. However, if electronic inspection through image analysis does not function, evaluation may be subjective analog evaluation and, thus, it is difficult to execute a program of smart contract.

Possibility of Other Embodiments

While the transaction management system and the like according to the present disclosure have been described with reference to the embodiment above, the subject and apparatuses by which each of the processes is performed are not particularly limited. The processes may be performed by a processor incorporated into a specific apparatus locally disposed (described in more detail below). Alternatively, the processes may be performed by a cloud server or the like disposed at a location different from the location of the local apparatus.

In addition, the transaction management system according to the present disclosure may have a function of accumulating the seller ratings and buyer ratings which each of the seller (the second person) and the buyer (the first person) writes for the other party and enabling the first person and the second person to look at the ratings. In this manner, the first person and the second person can be aware whether the other party is malicious or not in advance. As a result, a transaction involving transfer of a proper item can be executed more securely and reliably without face-to-face contact.

It should be noted that the present disclosure is not limited to the above embodiments. For example, another embodiment achieved by combining the constituent elements described above in any way or removing some of the constituent elements from each of the embodiments above may be included in the embodiments of the present disclosure. In addition, various modifications of the present embodiment that those skilled in the art conceive within the sprit of the present disclosure, that is, within the scope and spirit of the claims appended hereto are encompassed within the present disclosure.

Furthermore, the present disclosure further includes the following cases.

(1) More specifically, each of the above-described apparatuses is a computer system including but not limited to a microprocessor, a read only memory (ROM), a random access memory (RAM), a hard disk unit, a display unit, a keyboard, and a mouse. A computer program is stored in the RAM or the hard disk unit. The microprocessor operates in accordance with the computer program and, thus, the apparatus achieves its function. The computer program is formed by combining a plurality of instruction codes indicating instructions to the computer in order to achieve a predetermined function.

(2) Some or all of the constituent elements that constitute each of the apparatuses may be formed from a single system LSI (Large Scale Integration). A system LSI is a super multifunctional LSI produced by integrating a plurality of constituent units into one chip. More specifically, the system LSI is a computer system including a microprocessor, a ROM, and a RAM. The RAM has a computer program stored therein. The microprocessor operates in accordance with the computer program and, thus, the system LSI achieves its function.

(3) Some or all of the constituent elements that constitute each of the above-described apparatuses may be formed from an IC card or a single module removable from the apparatus. The IC card or the module is a computer system formed from, for example, a microprocessor, a ROM, and a RAM. The IC card or the module may include the above-described super multifunctional LSI. When the microprocessor operates in accordance with the computer program, the IC card or the module achieves its function. The IC card or the module may be tamper resistant.

(4) Furthermore, the present disclosure may relate to the above-described methods. Still furthermore, the present disclosure may be a computer program that implements these methods by a computer, or the present disclosure may be a digital signal composed of the computer program.

(5) Furthermore, the present disclosure may relate to a recording medium from which a computer can read the above-described computer program or digital signal. Examples of the recording medium include a flexible disk, a hard disk, a CD-ROM, a magnetooptic disc (MO), a digital versatile disk (DVD), a DVD-ROM, a DVD-RAM, a BD (Blu-ray (registered trademark) Disc), and a semiconductor memory. Alternatively, the present disclosure may relate to the digital signal recorded on such a recording medium.

In addition, the present disclosure may relate to the computer program or the digital signal transmitted via, for example, an electric communication network, a wireless or wired communication network, a network represented by the Internet, or data broadcasting.

In addition, the present disclosure may relate to a computer system including a microprocessor and a memory. The memory may store the computer program therein, and the microprocessor may operate in accordance with the computer program.

In addition, the present disclosure may be implemented by another independent computer system by recording the program or the digital signal in the storage medium and transferring the storage medium or transferring the program or the digital signal via, for example, the above-mentioned network.

The present disclosure can be applied to a transaction management system or the like that manages a transaction involving transfer of an item between a first person and a second person and, in particular, a transaction management system capable of guaranteeing a transaction involving transfer of, for example, an item even via a courier.

What is claimed is:

1. A management system for managing a transaction of an item between a first user and a second user, comprising:
    a first lock that is at least openable through an electronic process so as to be attached to the item and be removed from the item after being opened;
    a storage unit with a second lock attached to the storage unit, the second lock being at least openable through an electronic process, the storage unit being capable of physically storing the item; and
    a processor that performs management tasks relating to holders of lock opening privileges and management tasks relating to a transaction involving an item, the lock opening privileges including a first privilege to open the first lock and a second privilege to open the second lock,
    wherein, when the first user is a holder of the first privilege and the second privilege, the first user is permitted to open the second lock and remove the item from the storage unit and is permitted to open the first lock attached to the item and remove the first lock from the item,
    wherein upon receiving, from the storage unit, information indicating that the second lock is opened, the processor performs management tasks on the basis that a first transaction is concluded in which the first user tentatively receives the item from the second user,
    wherein upon receiving, from the first lock, information indicating that the first lock is opened, the processor performs management tasks on the basis that a second transaction is concluded in which the first user inspects the item and finally receives the item, and
    wherein the first lock that is at least openable through the electronic process and is attached to the item to permit an operation of the item and a visual inspection of the item to be performed while the first lock is attached to the item.

2. The management system according to claim 1, wherein a history of the opening of the first lock and a history of the opening of the second lock are recorded in at least one of a ledger in the management tasks relating to a transaction or the management tasks relating to a holder of the lock opening privilege,
    wherein when, in the management tasks relating to the transaction, information indicating that the second lock is opened is acquired from the storage unit and the information indicating that the second lock is opened is recorded in the ledger, the processor performs management tasks on the basis that the first transaction is concluded, and
    wherein when information indicating that the first lock is opened is recorded in the ledger, the processor performs management tasks on the basis that the second transaction is concluded.

3. The management system according to claim 2, wherein the ledger comprises blockchain-based distributed ledgers, and
    wherein the processor performs management tasks relating to a holder of the lock opening privilege so as to accumulate registration of the first privilege and the second privilege as a history.

4. The management system according to claim 2, further comprising:
    a sensor that detects that the first lock is broken,
    wherein when information indicating that the first lock is broken is acquired from the sensor and information indicating that the first lock is opened is recorded in the ledger, the processor performs management tasks relating to a transaction on the basis that the second transaction is concluded.

5. The management system according to claim 2, wherein when after the first transaction is executed, the first user inspects the item and does not finally receive the item as the result of inspection, the item is transferred back to the second user, and
    wherein when a predetermined period of time elapses from the time the processer performs management tasks relating to a transaction on the basis that the first transaction is concluded without the first lock being opened and without the first user shipping the item back to the second user, the processor performs management tasks on the basis that the second transaction is concluded.

6. The management system according to claim 1, wherein the first lock is in the form of a tag, and
    wherein the first lock is connected to the item so as to be attached to the item.

7. The management system according to claim 1, wherein the storage unit further includes an RFID reader, and the first lock or the item further has an RFID attached thereto, and
    wherein after the processor performs management tasks relating to a transaction on the basis that the first transaction is concluded, when the processor acquires, from the storage unit, information indicating that the storage unit reads the RFID by using the RFID reader and determines that the item is physically stored in the storage unit and, thereafter, the second lock is closed and when the first lock is not opened, the processor performs management tasks relating to a transaction on the basis that the second transaction is not concluded.

8. The management system according to claim 1, wherein the first user is a buyer, the second user is a seller, and the item is an item offered for sale by the second user, and
    wherein the first transaction is a transaction in which the first user determines whether the item is an item that the first user wants to purchase before deciding to purchase the item, and the second transaction is a transaction in which the first user decides to purchase the item.

9. The management system according to claim 8, wherein the management tasks further include a task in which the management system receives and temporarily keeps a payment amount in an electromagnetic manner,
    wherein when the processor performs management tasks relating to a transaction on the basis that the second transaction is concluded, the management system remits the payment amount to the second user, and
    wherein when the processor performs management tasks relating to a transaction on the basis that the second transaction is not concluded, the management system returns the payment to the first user.

10. The management system according to claim 1, wherein when the information indicating that the second lock is opened is received, and information indicating failing of inspection is received without receiving the information indicating that the first lock is opened, the processor performs management tasks on the basis that the item is being returned to the storage unit without opening the first lock.

11. The management system according to claim 1, wherein the first lock is opened by the first user by submitting a request via a terminal to open the first lock, the request having at least identifying information of the first lock and identifying information of the item.

12. The management system according to claim 1, wherein after the processor performs management tasks relating to a transaction on the basis that the first transaction is concluded, when the first lock is not opened and when the item is physically stored in the storage unit and the second lock is closed, the processor performs management tasks relating to a transaction on the basis that the second transaction is not concluded.

13. A method for use of a management system for managing a transaction of an item between a first user and a second user, the management system including a first lock that is at least openable through an electronic process so as to be attached to the item and be removed from the item after being opened and a storage unit with a second lock attached to the storage unit, the second lock being at least openable through an electronic process, the storage unit being capable of physically storing the item, the method comprising:
    performing management tasks relating to holders of lock opening privileges, the lock opening privileges including a first privilege to open the first lock and a second privilege to open the second lock; and
    performing management tasks relating to a transaction involving an item,
    wherein in the management tasks relating to holders of lock opening privileges, when the first user is a holder of the first privilege and the second privilege, the first user is permitted to open the second lock and remove the item from the storage unit and is permitted to open the first lock attached to the item and remove the first lock from the item,
    wherein in the management tasks relating to a transaction, when information indicating that the second lock is opened is received from the storage unit, the management tasks are performed on the basis that a first transaction is concluded in which the first user tentatively receives the item from the second user,
    wherein in the management tasks relating to a transaction, when information indicating that the first lock is opened is received from the first lock, the management tasks are performed on the basis that a second transaction is concluded in which the first user inspects the item and finally receives the item, and
    wherein the first lock that is at least openable through the electronic process and is attached to the item to permit an operation of the item and a visual inspection of the item to be performed while the first lock is attached to the item.

14. A non-transitory computer-readable recording medium storing a program which, when executed by a computer of a management system, performs a method for use of the management system for managing a transaction of an item between a first user and a second user, the management system including a first lock that is at least openable through an electronic process so as to be attached to the item and be removed from the item after being opened and a storage unit with a second lock attached to the storage unit, the second lock being at least openable through an electronic process, the storage unit being capable of physically storing the item, the method comprising:
    performing management tasks relating to holders of lock opening privileges, the lock opening privileges including a first privilege to open the first lock and a second privilege to open the second lock; and
    performing management tasks relating to a transaction involving an item,
    wherein, in the management tasks relating to holders of lock opening privileges, when the first user is a holder of the first privilege and the second privilege, the first user is permitted to open the second lock and remove the item from the storage unit and is permitted to open the first lock attached to the item and remove the first lock from the item,
    wherein in the management tasks relating to a transaction, when information indicating that the second lock is opened is received from the storage unit, the management tasks are performed on the basis that a first transaction is concluded in which the first user tentatively receives the item from the second user,
    wherein in the management tasks relating to a transaction, when information indicating that the first lock is opened is received from the first lock, the management tasks are performed on the basis that a second transaction is concluded in which the first user inspects the item and finally receives the item, and
    wherein the first lock that is at least openable through the electronic process and is attached to the item to permit an operation of the item and a visual inspection of the item to be performed while the first lock is attached to the item.

* * * * *